United States Patent [19]
Ooi et al.

[11] Patent Number: 5,754,260
[45] Date of Patent: May 19, 1998

[54] PROJECTION TYPE COLOR LIQUID CRYSTAL OPTICAL APPARATUS

[75] Inventors: Yoshiharu Ooi; Tsuneo Wakabayashi; Shigeyuki Serizawa; Yoshiyuki Sonda; Masaya Kunigita; Yoshinori Hirai, all of Yokohama, Japan

[73] Assignee: AG Technology Co., Ltd., Yokohama, Japan

[21] Appl. No.: 810,984

[22] Filed: Feb. 27, 1997

Related U.S. Application Data

[60] Division of Ser. No. 198,275, Feb. 18, 1994, Pat. No. 5,648,860, which is a continuation-in-part of Ser. No. 133,222, Oct. 7, 1993, Pat. No. 5,659,409.

[30] Foreign Application Priority Data

| Oct. 9, 1992 | [JP] | Japan | 4-298019 |
|---|---|---|---|
| Oct. 9, 1992 | [JP] | Japan | 4-298020 |
| Feb. 18, 1993 | [JP] | Japan | 5-052920 |
| Apr. 14, 1993 | [JP] | Japan | 5-111043 |

[51] Int. Cl.$^6$ ............... G02F 1/1335; H04N 9/31
[52] U.S. Cl. ............... 349/10; 349/8; 349/139; 349/57; 349/62
[58] Field of Search ............... 349/5, 7, 8, 10, 349/61, 62, 67, 86, 114, 139, 143, 201; 353/31, 34, 33, 37, 102, 122; 348/751, 756, 757, 742

[56] References Cited

U.S. PATENT DOCUMENTS

| 4,613,027 | 9/1986 | Fergason . |
| 4,818,070 | 4/1989 | Gunjima et al. . |
| 4,834,509 | 5/1989 | Gunjima et al. . |
| 5,103,327 | 4/1992 | Hirai et al. . |
| 5,162,934 | 11/1992 | Gunjima et al. . |
| 5,196,952 | 3/1993 | Hirai et al. . |
| 5,216,531 | 6/1993 | Hirai et al. . |

(List continued on next page.)

FOREIGN PATENT DOCUMENTS

| 4-13104 | 1/1992 | Japan . |
| 4-127102 | 4/1992 | Japan . |
| 4-305637 | 10/1992 | Japan . |

OTHER PUBLICATIONS

Applied Optics, Jul. 10, 1992, vol. 31, No. 20, Cardinal Warde, et al., "Charge-Transfer-Platee Spatial Light Modulators", pp. 3971–3979.

1989 Autumn Meeting of Electronics, Information and Communication Academy, "Reflective Type High Density TFT Array for High Definition Liquid Crystal Projection TV", pp. 5–30.

Liquid Crystals Applications and Uses, vol. 1, 1990, S.E. Shields, et al., "Light Valve Projection Mode LCDs", pp. 455–467, 488–489.

SPIE vol. 1255 Large–Screen Projection Displays II (1990), R. Gerhard–Multhaupt, et al., "Viscoelastic Spatial Light Modulators and Schlieren–Optical Systems for HDTV Projection Displays", pp. 69–78.

*Primary Examiner*—William L. Sikes
*Assistant Examiner*—Tai V. Duong
*Attorney, Agent, or Firm*—Oblon, Spivak, McClelland, Maier & Neustadt, P.C.

[57] ABSTRACT

A light source optical system for projection 1, dichroic mirrors 21, 22 disposed to have a predetermined included angle β, a reflection type liquid crystal optical element blocks 31–33 each including a closely contacted converging lens and having a reflection surface and a projection optical system 4 are provided, wherein the normal line of a dichroic mirror surface and the optical axis of incident light form an included angle α; the normal line of the reflection surface and the optical axis of incident light form an included angle γ; light emitted from a light source is color-separated so as to become color lights; the color lights are rendered to be parallel light beams, and are modulated and reflected by means of the reflection type liquid crystal optical elements; the reflected light beams are color-synthesized; and the color-synthesized light is projected through a projection lens. A projection type color liquid crystal optical apparatus having a compact shape and a high brightness is obtainable.

20 Claims, 14 Drawing Sheets

U.S. PATENT DOCUMENTS

| | | |
|---|---|---|
| 5,235,445 | 8/1993 | Hirai et al. |
| 5,274,480 | 12/1993 | Hirai et al. ............ 349/5 |
| 5,299,289 | 3/1994 | Omae et al. ............ 349/10 |
| 5,379,083 | 1/1995 | Tomita ............ 353/122 |
| 5,379,135 | 1/1995 | Nakagaki et al. ............ 349/9 |
| 5,398,081 | 3/1995 | Jones ............ 349/5 |
| 5,451,103 | 9/1995 | Hatanaka et al. ............ 353/31 |
| 5,477,351 | 12/1995 | Takahara et al. ............ 349/5 |

PROJECTION TYPE COLOR LIQUID CRYSTAL OPTICAL APPARATUS

This is a Division of application Ser. No. 08/198,275 filed on Feb. 18, 1994, now U.S. Pat. No. 5,648,860 which is a Continuation-In-Part of application Ser. No. 08/133,222 filed Oct. 7, 1993, now U.S. Pat. No. 5,659,409.

BACKGROUND OF THE INVENTION

FIELD OF THE INVENTION

The present invention relates to a projection type color liquid crystal optical apparatus comprising a light source system for projecting light, color separating and synthesizing dichroic mirrors, three reflection type liquid crystal optical elements and a projection lens as its constituent elements.

In recent years, a transparent/scattering type liquid crystal optical element in which a liquid crystal and solidified matrix composite is held wherein a nematic liquid crystal is dispersed and and held in a solidified matrix, and the refractive index of the solidified matrix is made substantially coincident with the refractive index of the liquid crystal used in either state of application or non-application of a voltage, has been noted. The transparent/scattering type liquid crystal optical element has an advantage enabling a bright display because no polarization plate is used. Therefore, the optical element is gathering an attention when it is, in particular, used for a projection type optical apparatus because a bright projection picture image is obtainable.

When the transparent/scattering type liquid crystal optical element is used as a reflection type element wherein a light reflection layer is formed on a surface of the element, light is reciprocated in a layer of a light modulating material so that there is obtainable a working length twice as large as a case of using the optical element as a transmission type element, whereby it can be used as an element having a high scattering ability in a scattering stage.

Accordingly, when the transparent/scattering type liquid crystal optical element is used for the reflection type optical apparatus, there is a clear difference between a transparent state and a scattering state, and a high contrast display becomes possible in comparison with a case of the transmission type optical apparatus.

Further, a projection type color liquid crystal optical apparatus wherein the transparent/scattering type liquid crystal optical element is used as a reflection type element, in particular, a projection type color liquid crystal optical apparatus wherein light from a white light source is subjected to color-separation into three colors: blue (B), green (G) and red (R), and each of the color lights is modulated with use of three reflection type liquid crystal optical elements, is useful because full color projection becomes possible by regulating light scattering properties of the reflection type liquid crystal optical elements.

Further, it has been proposed a full color projection type display apparatus using a reflection type liquid crystal display element wherein an electrode in a back electrode substrate is constituted by divided picture element electrodes, and each of the picture element electrodes is driven by an active element such as a TFT or the like which is provided for each picture element.

When the active element and a storage capacitor are formed for each of the picture elements, reduction in a numerical aperture ratio of a picture element due to the formation of the capacitor in the reflection type liquid crystal display element can be eliminated whereby a high aperture ratio can be obtained in comparison with that of a transmission type liquid crystal display element. Further, flexibility in designing the active element such as TFT can be increased.

As a projection type color liquid crystal optical apparatus in which the transparent/scattering type liquid crystal optical element is used as a reflection type element, there is described a projection type liquid crystal display apparatus in, for instance, Japanese Unexamined Patent Publication No. 502286/1986 wherein a single reflection type display element having color filters of blue, green and red in a mosaic form is used. However, the publication does not describe a color projection system wherein light from a white light source is subjected to color separation into three colors of B, G and R, and each of the color lights is modulated with use of three reflection type elements.

Regarding to the projection type color liquid crystal display apparatus wherein the transparent/scattering type liquid crystal optical element is used as a reflection type element, light from a white light source is subjected to color separation into three color lights of B, G and R, and the color lights are modulated with use of three reflection type elements, the construction of an optical system used in the display apparatus is described in FIG. 5 of Japanese Unexamined Patent Publication No. 142528/1992, or FIG. 1 of Japanese Unexamined Patent Publication No. 232917/1992.

In each of the publications, an ellipsoidal mirror is used for a condenser mirror in a light source optical system. Light emitted from the light source optical system is rendered to be parallel light beams with use of a single convex lens, and the parallel light beams are incident into each reflection type element of the three transparent/scattering type liquid crystal optical elements.

Dichroic prisms intersecting at an angle of 45° are arranged as a color separating and synthesizing system between the convex lens for parallel light beams and the reflection type elements. The conventional technique is shown in FIGS. 18 and 19. FIG. 18 is a plane view of the optical system wherein the light source optical system and a projection lens are omitted, and FIG. 19 is a side view showing the entirety of the optical system. As a result, it is necessary to provide spaces between a projection lens 142 and a convex lens 130 for forming parallel light beams and between a light source optical system 101 and the convex lens 130 for parallel light beams to thereby result an increase in volume of the color projection type liquid crystal display apparatus.

Further, dichroic prisms 102 can allow optical adjustment to be easy and to advantageously shorten the optical path in comparison with flat plate type dichroic mirrors generally used in the conventional projection type color liquid crystal display apparatus using transmission type liquid crystal optical elements. However, use of the dichroic prisms 102 increases the weight and results in a higher manufacturing cost.

Further, incident light to and reflection light from reflection type liquid crystal optical elements 131, 132, 133 are not on the same optical axis but they are entered and reflected with certain angles with respect to the reflection surface of the reflection type liquid crystal optical elements. Accordingly, in order to utilize light without loss, the effective surfaces of a color separating and synthesizing system 102 and the convex lens 130 for parallel light beams should have a larger surface area in comparison with the reflection surface of the reflection type liquid crystal optical elements; this causing an increase in the volume and weight of the apparatus.

Further, the convex lens 130 for parallel light beams influences the imaging function of the projection lens 142 with respect to the three color lights of B, G and R. Accordingly, when the convex lens is used for a projection type display apparatus, it is necessary to combine two or more number of lenses to reduce chromatic aberration, this resulting in a complicated structure.

On the other hand, in place of the dichroic prisms intersecting at an angle of 45° which are used for a color separating and synthesizing system, a construction shown in FIGS. 20 and 21 wherein flat plate type dichroic mirrors are crossed at an angle of 45°, can be considered.

FIG. 20 is a plane view and FIG. 21 is a side view wherein reflection type liquid crystal optical elements 231, 232 for lights reflected and separated by the dichroic mirror 202 are omitted. In this case, although lightweighting effect and a cost reduction can be achieved in comparison with a case of using the dichroic prism, there is a problem that the shadow of the crossing part of the dichroic mirrors is apt to be projected on a screen. This causes a serious problem of deteriorating the quality of display by the projection type display apparatus.

Further, in a projection type color display apparatus using a conventional transmissive type liquid crystal optical element, since two kinds of dichroic mirrors are generally used for a color separating system and a color synthesizing system respectively, there is flexibility in adjusting the color purity of the three colors of B, G and R by using four dichroic mirrors.

However, in a case of a projection type color liquid crystal display apparatus using a reflection type liquid crystal optical element, it is necessary to adjust the color purity of the three colors of B, G and R by using two kinds of two dichroic mirrors as shown in FIGS. 18 through 21. Under such condition, when a white light source having a high color rendering property and a high luminous efficacy such as a metal halide lamp, a xenon lamp, a halogen lamp or the like is used as a projection light source, excellent color purity in three colors of B, G and R can not be attained.

A reflection type display element using a visco-elastic material as a light modulating material is disclosed, for instance, SPIE VOL. 1255, "Large-Screen Projection Display (1990), page 69–78".

In the reflection type display element, a voltage is applied to the visco-elastic material by means of an active element which is provided for each picture element electrode whereby the reflection surface of the visco-elastic material is deformed depending on an applied voltage to thereby form a diffraction grating. When incident light is irradiated thereto, a diffraction light is produced.

In order to display a projection image having a high contrast ratio, a dark field schlieren optical system in which a schlieren stop is or schlieren bars are used to block a non-diffraction light. This provides a transparent state (a non-diffraction state) when no voltage is applied unlike a case that the liquid crystal and solidified matrix composite is used for a transparent/scattering type display element. Accordingly, the dark field schlieren optical system is used in order to make a non-voltage application state to be in a dark level display.

FIGS. 22 through 24 show three kinds of optical systems explained in the above-mentioned publications. FIG. 22 shows an optical system in which a schlieren stop is used as a non-diffraction light rejecting system; FIG. 23 shows an optical system in which a schlieren bars are used as a non-diffraction light rejecting system; and FIG. 24 shows an optical system in which a schlieren stop is used as a non-diffraction light rejecting system, and condenser lenses are used at a light source side and a projection side to transform incident light with respect to color separating and synthesizing dichroic mirrors into parallel light beams.

FIG. 22 to 24 shows light source LS, (light source) lens LC, dichroic mirror 21 and 22, lens L1, L2, L3, and optical display element E1, E2, E3, light converging lens L4 and so on.

In these optical systems, the visco-elastic material is not deformed when no voltage is applied, and a zero-order diffraction light (non-diffraction light) is blocked by the schlieren stop or the schlieren bars whereby light is not projected on the screen. Accordingly, while a dark level in a picture image can be controlled to have a lower value, a bright level does not form a bright projection image unless diffraction intensity is sufficient.

Further since the projection light is a component of a diffraction light, collimation is uneven. When the length of a light path reaching the projection lens is large, light is scattered and lost in an intermediate portion of the light path, and light flux projected on the screen is reduced. Further, a projection lens having a large aperture is necessary in order to efficiently collect the diffraction light on the screen.

Accordingly, in the dark field schlieren optical system used for a reflection type display element using a visco-elastic material, since a diffraction light in which collimation is lost is used as a projection light, the light is scattered and lost in a way to reach the projection lens, or light is rejected at the aperture of the projection lens when the ordinary optical system is used, and an amount of the light reaching the screen is disadvantageously reduced. In order to reduce a light loss as described above, a large-sized color separating and synthesizing system (dichroic mirrors) and a projection lens having a large aperture are needed; this inviting a large-sized apparatus.

In the above-mentioned publications, advantages and disadvantages are described on the three kinds of optical systems shown in FIGS. 22 through 24. However, the optical systems involves the above-mentioned problems, and conclusion is not provided as to which form is finally preferred. Accordingly, in a projection type color liquid crystal optical apparatus in which a transparent/scattering type liquid crystal optical element is used for a reflection type liquid crystal optical element, an apparatus of a small size, a light weight and having a high color purity is expected.

Further, J. E. Gunther, in "High Visibility Color Projection Display" (final technical report), HAC reference number F2317, (1986) discloses a projection type display apparatus in which three reflection type liquid crystal display elements comprising active elements formed of singlecrystalline silicon and a DSM type liquid crystal as a light modulating means are used, and a prism block of three prisms is used as a color separating and synthesizing optical system (refer to FIG. 31).

In the disclosed projection type display apparatus, the incident angle of light to a dichroic mirror surface is 45° or lower, and sharpness in color separation and synthesization is high in comparison with a dichroic mirror or a dichroic prism having a 45° light incidence structure. Accordingly, the color purity of a projection light is high. However, the projection type display apparatus had disadvantages that three prisms are required for a prism block, and the length of a light path between a condenser lens 830 and a display elements 831, 832, 833 is long in comparison with a 45° incidence-intersection type color separating and synthesizing system shown in FIGS. 18 through 21.

Generally, a white color light source such as a metal halide lamp, a xenone lamp, a halogen lamp or the like which has a high brightness of luminescence and a long life of luminescence does not provide a complete point source. Accordingly, it is difficult to focus light to a point even when light is collected by means of a lens in the light source system shown in the Figures. Further, parallel light beams having good collimation can not be obtained even when a lens 830 is used to make light reflected from a reflection plate to be parallel light beams. Thus, when an incident light to a liquid crystal display elements is not complete parallel light beams, a part of the light is not incident to the liquid crystal display elements but escapes from a side surfaces of a prism block, and a part of the light without collimation which is produced by the total reflection at the side surface of the prism is entered into the liquid crystal display elements.

Further, there is a possibility that a part of specular reflection light to be projected, which has been reflected at the reflection surface of the liquid crystal display elements and has passed through the prism to be projected finally, escapes from the side surface of the prism block, or a part of the specular reflection light is totally reflected at the side surfaces of the prism block, whereby the light does not enter into a projection lens.

The above-mentioned incident light of non-collimation does not contribute to the brightness of projection light since specular reflection of light is caused by the liquid crystal display elements in a transparent state and the light of specular reflection is not incident into the projection lens. Instead, the light is incident into the projection lens when the liquid crystal display element is in a scattering state. Accordingly, a dark level is increased. As a result, the brightness of the projection light is decreased and the contrast ratio of a display is deteriorated.

This requires to use a sufficiently large prism in comparison with a display area of the liquid crystal display element in order to realize a predetermined characteristic even when a practical light source is used. Accordingly, the weight of the apparatus is substantially increased. Further, with respect to light incident to the liquid crystal display element 831, it is necessary to form the incident light entering to a prism block to be parallel light beams because the light is totally reflected at the surface of a prism after it is color-separated in a dichroic mirror 821. Further, the focal length of an imaging lens is generally longer than the lens diameter. As a result, a large-sized projection lens system including a lens 830 for forming parallel light beams is required, so that the volume of the apparatus is increased.

Further, the incident angle of incident light to a liquid crystal display element is different from the incident angle of reflection light reflected at the liquid crystal display element with respect to the surface of the dichroic mirror 821 or 822 shown in FIG. 31. Accordingly, the spectral characteristics of the dichroic mirror at positions in the same dichroic mirror surface are varied whereby there causes the reduction of light utilization efficiency and stray light.

Japanese Unexamined Patent Publication No. 113344/1992 discloses a projection type display apparatus wherein a projection light source system comprises a light source, an ellipsoidal mirror, an aperture and a condenser lens. Specifically, the ellipsoidal mirror is used as a condenser mirror; the light source is disposed at the first focal point of the ellipsoidal mirror, light from the light source is collected to the second focal point position; light passing through the opening of the aperture disposed at the second focal point position is collected by the condenser lens; the collected light is introduced into a transparent/scattering type display element; light emitted through the display element is collected to a focal point position; and a second aperture having an opening is disposed at the focal point position. In the above-mentioned publication, there is reference to the use of a reflection type liquid crystal display element.

Further, Japanese Unexamined Patent Publication No. 142528/1992 and Japanese Unexamined Patent Publication No. 305637/1992, describe examples concerning a reflection type display apparatus in combination of the above-mentioned projection type display apparatus, a color separating and synthesizing system and three transparent/scattering display elements.

The present invention is to solve the above-mentioned problems and to provide a projection type color liquid crystal optical apparatus of a small size, a light weight and having a high color purity.

As the basic construction of the present invention, there are a three reflection type liquid crystal optical elements arranged in a Δ (delta) form at an angle of about 60° in a horizontal plane (a specific plane); a color separating and synthesizing optical system comprising two type dichroic mirrors arranged in a V form at an included angle β of about 60° and an optical arrangement for look-up (look-down) projection wherein light is emitted obliquely upwardly (or downwardly) from a light source optical system in a direction of a vertical plane with respect to the above-mentioned horizontal plane in a course from the light source system through the liquid crystal optical elements to a projection optical system; the emission light is incident into the color separating and synthesizing system, and the light is reflected at a reflection type liquid crystal optical element to be directed upwardly (downwardly). Wherein there is relationship of $\beta=\alpha1+\alpha2$. FIG. 27(a) shows perspective view of one embodiment of projection type color liquid crystal optical apparatus and FIG. 27(b) show the light path (optical axis AX) going to/coming back from the reflection layer. There is a case that the dichroic mirrors 21, 22 are a little bit inclined normal plane for $H_p$.

Namely, in accordance with the present invention, there is provided a first projection type color liquid crystal optical apparatus, comprising light source system, light modulating system, wherein three liquid crystal optical elements having a transparent/scattering type operation mode and liquid crystal and solidified matrix composite layer where a nematic liquid crystal is dispersed and held in a solidified matrix, is interposed between a front substrate with a transparent front electrode and a back substrate with back electrode, and the refractive index of the solidified matrix substantially agrees with the refractive index of the nematic liquid crystal used in either state of the application or the non-application of applied voltage for said liquid crystal and solidified matrix composite layer; three reflection layers; and three condenser lenses are arranged; color separating and synthesizing optical system wherein two color separating and synthesizing means are arranged substantially at an angle β in the range of 40°–70° in a horizontal plane; and light projection optical system; wherein the optical axis from light source system to light projection optical system is arranged in a look-up or down projection form in the substantially normal plane with respect to said horizontal plane; and the light emitted obliquely and upwardly or downwardly from light source travels through said color separating and synthesizing optical system and said light modulating system along the optical axis wherein the first color separating and synthesizing means is set to have an incident angle α1 for optical axis in the range of about 20°–35°, the second color separating and synthesizing means is set to have an incident angle α2 for optical axis in the range of about 20°–35°, and the light is separated into the three color lights and modulated respectively by said each liquid crystal optical element and reflected respectively with an incident angle γ in the range of 1°–20° by said each reflection layer and converged respectively by said each condenser lens; and the modulated and converged three color lights are synthesized and enters into said light projection optical system to be projected.

In the first projection type color liquid crystal optical apparatus, it is not always necessary that α1 and α2 are completely in coindence with each other.

Further, the definition of the angle in a horizontal plane means an angle obtained when two dichroic mirrors (flat type) are projected on a certain flat plane, or an angle cross-sectioned along the flat plane. For instance, the angle β appears on the plane in FIG. 1.

In accordance with the present invention, there is provided a second projection type color liquid crystal optical apparatus, wherein in the first projection type color liquid crystal optical apparatus, wherein the angle α1 is nearly equal to the angle α2 and the angle γ is in the range of about 2°–10°.

In the second projection type color liquid crystal optical apparatus, it is preferable that the angle α1 is set to be about 30° (β=60°).

In accordance with the present invention, there is provided a third projection type color liquid crystal optical apparatus, wherein in the first or the second projection type color liquid crystal optical apparatus, wherein the three condenser lenses are attached on the front side of the each liquid crystal optical element respectively.

In accordance with the present invention, there is provided a fourth projection type color liquid crystal optical apparatus, wherein in any of the first through the three projection type color liquid crystal optical apparatus, wherein the three reflection layers are fabricated in the three liquid crystal optical elements respectively.

In accordance with the present invention, there is provided a fifth projection type color liquid crystal optical apparatus, wherein in any of the first through the fourth projection type color liquid crystal optical apparatus, wherein the condenser lenses are arranged between the liquid crystal optical element and the color separating and synthesizing means respectively and an charge transfer plate (CTP) is used for the back substrate of the liquid crystal optical element where a CTP in which a number of thin electric conductive wires are embedded in an insulating material is provided; said reflection layer is interposed between said CTP and the layer of the liquid crystal and solidified matrix composite.

In accordance with the present invention, there is provided a sixth projection type color liquid crystal optical apparatus, wherein in any of the first through the fifth projection type color liquid crystal optical apparatus, wherein the light source system comprises a ellipsoidal reflection mirror, a light source and a aperture wherein the light emitting part of the light source is located in the vicinity of the first focal point of the ellipsoidal reflection mirror and the opening of the aperture is located in the vicinity of the second focal point of the ellipsoidal reflection mirror and a cone-like prism or a cone-like reflector is arranged in the vicinity of the second focal point of the ellipsoidal mirror.

So preferable collimation angle of the light from light source such as 6°–10° is obtainable.

In accordance with the present invention, there is provided a seventh projection type color liquid crystal optical apparatus, wherein in any of the first through the sixth projection type color liquid crystal optical apparatus, wherein said liquid crystal optical element comprising a transparent insulating front substrate and a back substrate where a plurality of row electrode lines, column electrode lines, active elements disposed in the vicinity of each intersection of the row and column electrode lines, a multi-layered dielectric film mirror for covering partly or entirely the row electrode lines, the column electrodes lines, and active elements are provided; and the pixel electrodes are transparent electrodes formed on or above said multi-layered dielectric film mirror.

In this characteristic structure of transparent electrode on/above mirror in TFT substrate is available for single liquid crystal optical device.

In accordance with the present invention, there is provided a eighth projection type color liquid crystal optical apparatus, wherein in any of the first through the seventh projection type color liquid crystal optical apparatus, wherein said liquid crystal optical element comprising a transparent insulating front substrate and a back substrate where a plurality of row electrode lines, column electrode lines, active elements disposed in the vicinity of each intersection of the row and column electrode lines and the third electrode are provided; and said third electrode is arranged so as to cover partly or entirely the row electrode lines, the column electrode lines and the active elements and/or to cover substantially the gap between the neighbouring pixel electrodes; and the electric potential between said third electrode and said front electrode is kept to be equal to or to be lower than the threshold level of the liquid crystal and solidified matrix composite.

In this projection type color liquid crystal optical apparatus, a functional drawback caused by the neighbouring pixel gap in reflection type liquid crystal optical element is improved and good aperture ratio is obtained and lower driving voltage is available due to electrical efficiency for liquid crystal and solidified matrix composite. Also, this third electrode structure and biasing with substantially the same level of front electrode in liquid crystal optical element having liquid crystal and solidified matrix composite is available for single LCD panel application.

In accordance with the present invention, there is provided a ninth projection type color liquid crystal optical apparatus, wherein in any of the first through the eighth projection type color liquid crystal optical apparatus, wherein either the first or the second color separating and synthesizing means is provided with a distribution in a manner that the spectral transmittance changes at position in each surface so as to compensate the difference of the spectral transmittance corresponding to the difference of light incident angle at said position.

In accordance with the present invention, there is provided a tenth projection type color liquid crystal optical apparatus, wherein in any of the first through the ninth projection type color liquid crystal optical apparatus, wherein the reflection layer is provided with a multi-layered dielectric film having a relatively high refractive index and a relatively low refractive index alternately.

In accordance with the present invention, there is provided a eleventh projection type color liquid crystal optical apparatus, wherein in any of the first through the tenth projection type color liquid crystal optical apparatus, wherein minute concave and convex are formed on the surface of front electrode or the interface of the front substrate.

In accordance with the present invention, there is provided a twelfth projection type color liquid crystal optical apparatus, wherein in any of the first through the eleventh projection type color liquid crystal optical apparatus, wherein a wavelength selecting and reflecting function of the reflection layer for compensating the color purity characteristic of the first and/or second color separating and synthesizing means is provided with at least one of the three reflection layers.

In accordance with the present invention, there is provided a thirteenth projection type color liquid crystal optical apparatus, wherein in any of the first through the twelfth projection type color liquid crystal optical apparatus, wherein wavelength selecting and absorbing function for compensating the color purity characteristic of the first and/or the second color separating and synthesizing means is provided with at least one of the condenser lens, the reflection layer or the liquid crystal optical element.

Further description is followed after.

In the projection type color liquid crystal optical apparatuses of the present invention, a liquid crystal optical element used has many advantages compared with conventional DSM or TN LCD element.

For example, the structure of the liquid crystal and solidified matrix composite such as capsule size R, shape, density are possible to be suited for wavelength region of color light. For example, $R_B < R_G < R_R$ of capsule size is available.

Further, the specific resistance of the liquid crystal and solidified matrix composite is preferably $5 \times 10^9$ Ωcm or higher. In order to minimize voltage drop due to a leak current or the like, a specific resistance of $10^{10}$ Ωcm or higher is more preferable. In this case, it is unnecessary to provide a larger storage capacitor to each picture element electrode.

Figure 5:
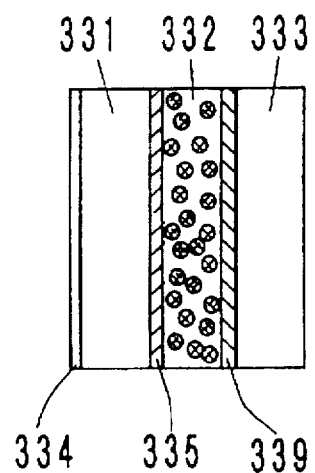
Figure 6:
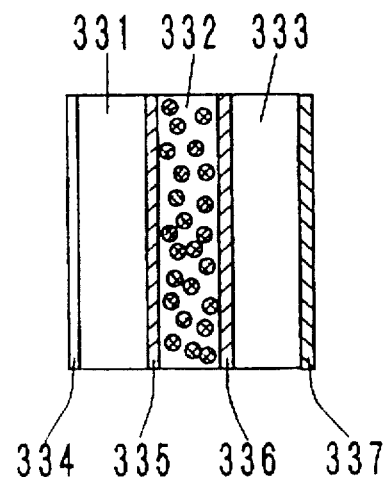
Figure 7:
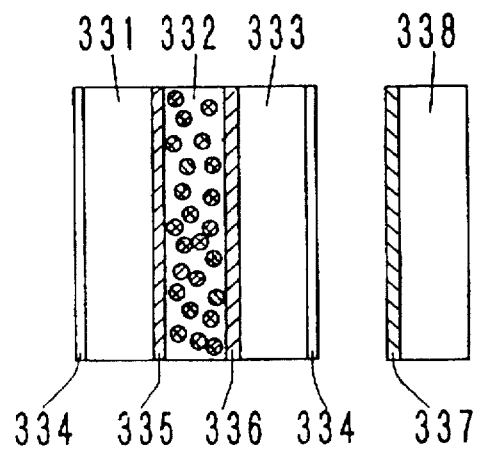
Figure 8:
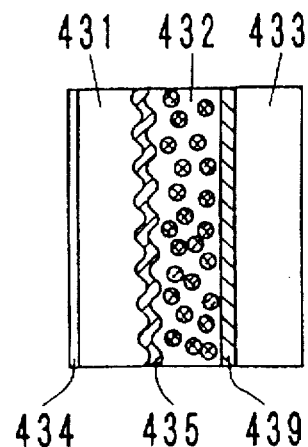
Figure 9:
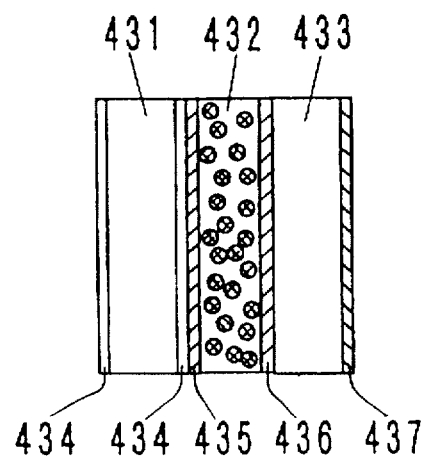
Figure 10:
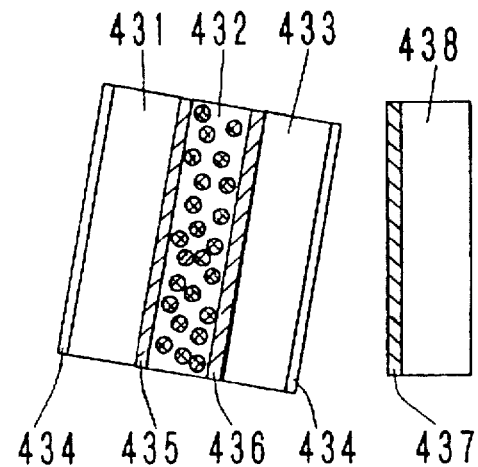
Figure 11:
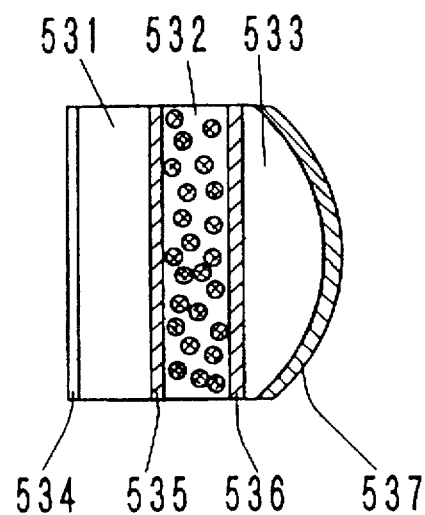
Figure 12:
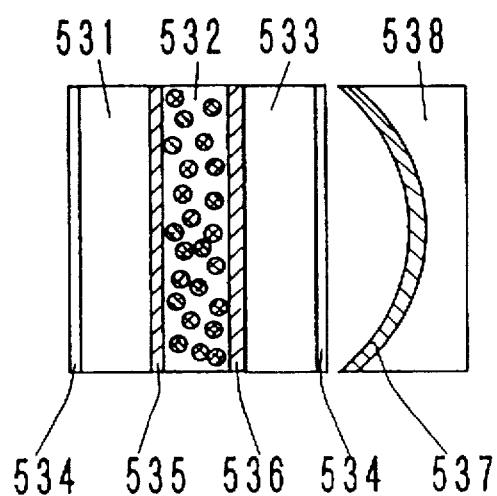
Figure 13:
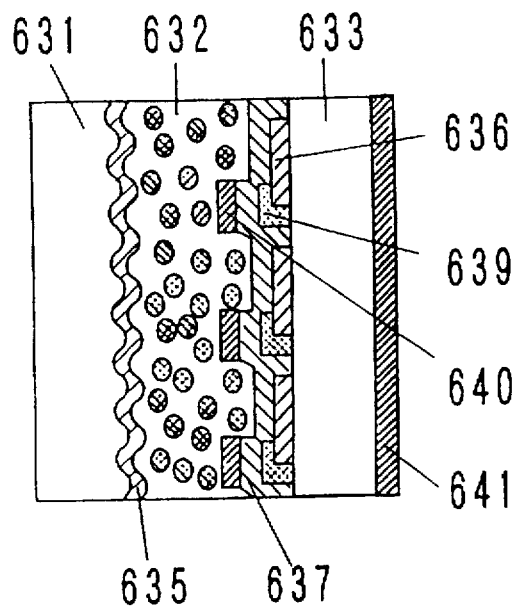
Figure 14:
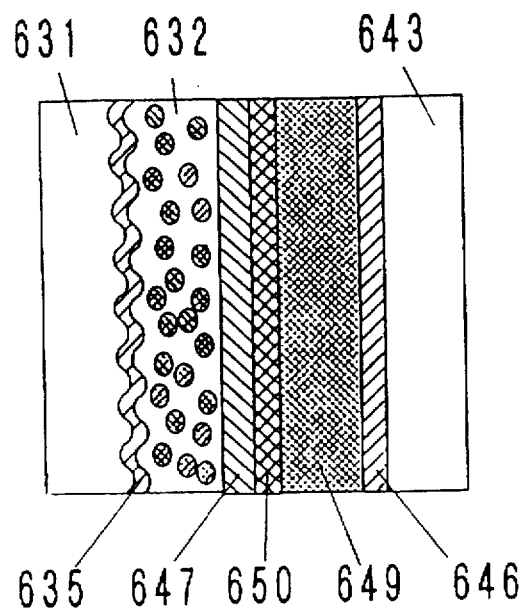
Figure 15:
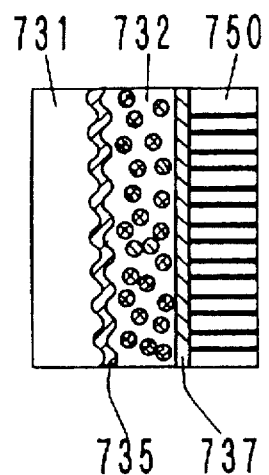
Figure 16:
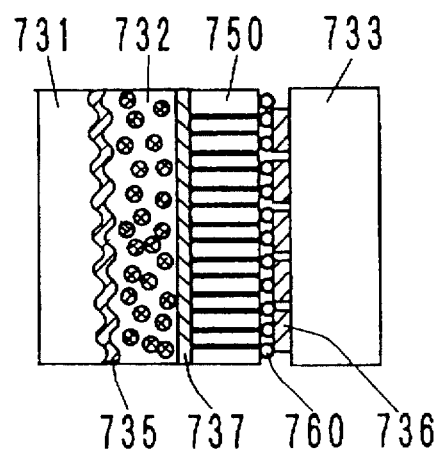
Figure 17:
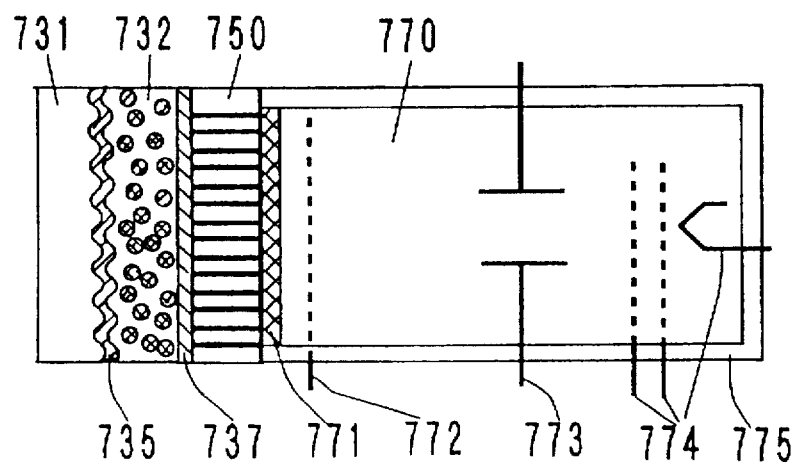
Figure 18:
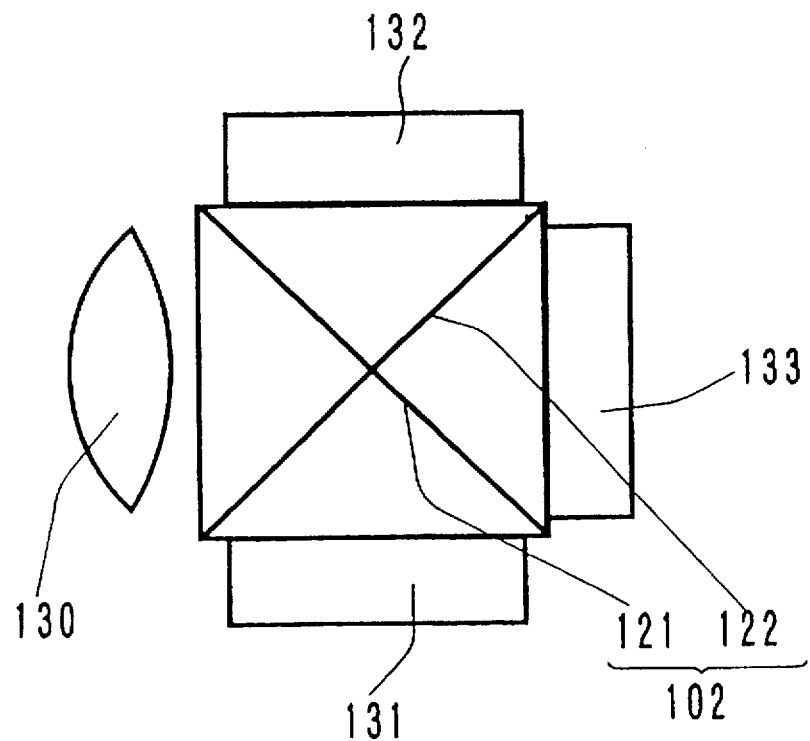
Figure 19:
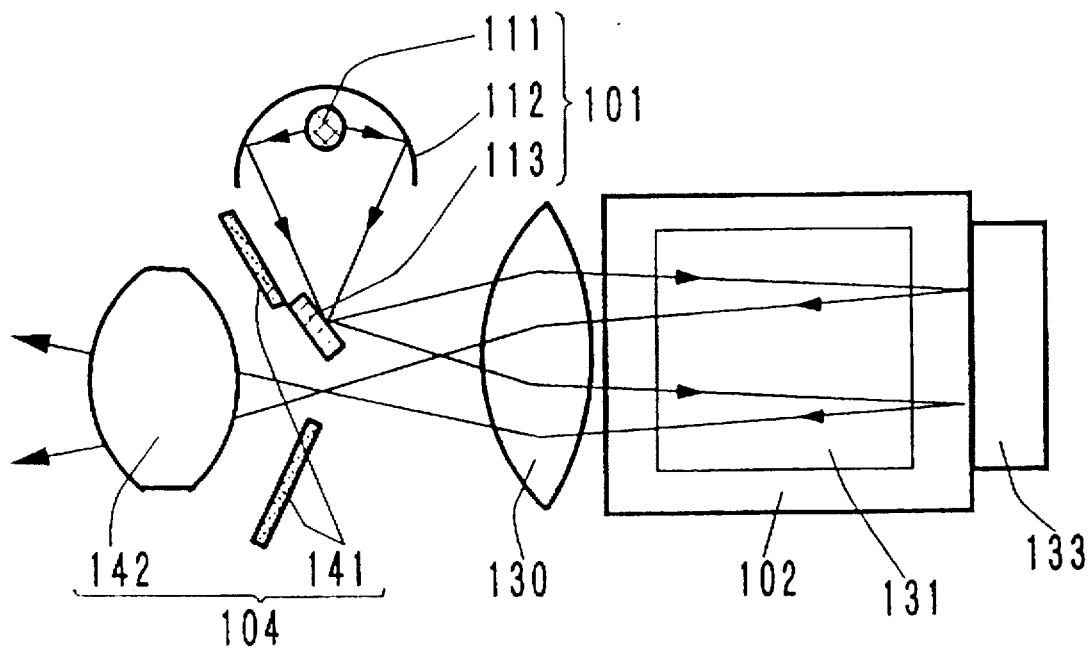

FIG. 5 is a cross-sectional view showing an embodiment of the reflection type liquid crystal optical element according to the present invention wherein a back electrode is used as a reflection surface; FIG. 6 is a cross-sectional view showing an embodiment of the reflection type liquid crystal optical element according to the present invention wherein a reflection surface is formed at a rear surface of a back substrate;

FIG. 7 is a cross-sectional view showing a state of a reflection means and a liquid crystal optical element which are arranged with a space so as to form a reflection type liquid crystal optical element as a whole;

FIG. 8 is a cross-sectional view showing a structure of the reflection type liquid crystal optical element of the present invention wherein a first means (a minute concave-convex surface) for reducing specular reflection at the interface is provided;

FIG. 9 is a cross-sectional view showing a construction of the reflection type liquid crystal optical element of the present invention wherein a second means (an antireflection film) for reducing specular reflection at the interface is provided;

FIG. 10 is cross-sectional view showing a construction of the reflection type liquid crystal optical element of the present invention wherein a third means (inclination) for reducing the influence for projection light of the specular reflection at the interface is provided;

FIG. 11 is a cross-sectional view showing a construction of the reflection type liquid crystal optical element in a case that a condenser mirror is directly disposed on a back substrate;

FIG. 12 is a cross-sectional view showing a construction in a case that a light reflecting and converging means is combined with a liquid crystal optical element wherein the light reflecting and converging means is formed by forming a condenser mirror on a different substrate;

FIG. 13 is a cross-sectional view showing an embodiment of the liquid crystal optical element of the present invention wherein a reflection film is provided between an active element and a light blocking film;

FIG. 14 is a cross-sectional view showing an embodiment of the liquid crystal optical element of the present invention in which a photo-conductive layer and a reflection film are provided;

FIG. 15 is a cross-sectional view showing an embodiment of a liquid crystal optical element using a CTP as a back electrode substrate, on a side surface of which a dielectric multi-layered mirror is formed;

FIG. 16 is a cross-sectional view showing an embodiment of a liquid crystal optical element in which a CTP having a dielectric multi-layered film mirror formed at its one surface is used as a back electrode substrate, and it is bonded to an active element substrate with bump bonds;

FIG. 17 is a cross-sectional view showing an embodiment of a liquid crystal optical element in which a CTP having a dielectric multi-layered film mirror formed at its one surface is used as a back electrode substrate and an electric image is supplied by a CRT;

FIG. 18 is a plane view showing an embodiment of a conventional projection type liquid crystal optical apparatus using dichroic prisms;

FIG. 19 is a side view showing an embodiment of the conventional projection type liquid crystal optical apparatus using the dichroic prisms, (light source system and projection optical system are schematically shown in partially cross-sectional view.)

Figure 20:
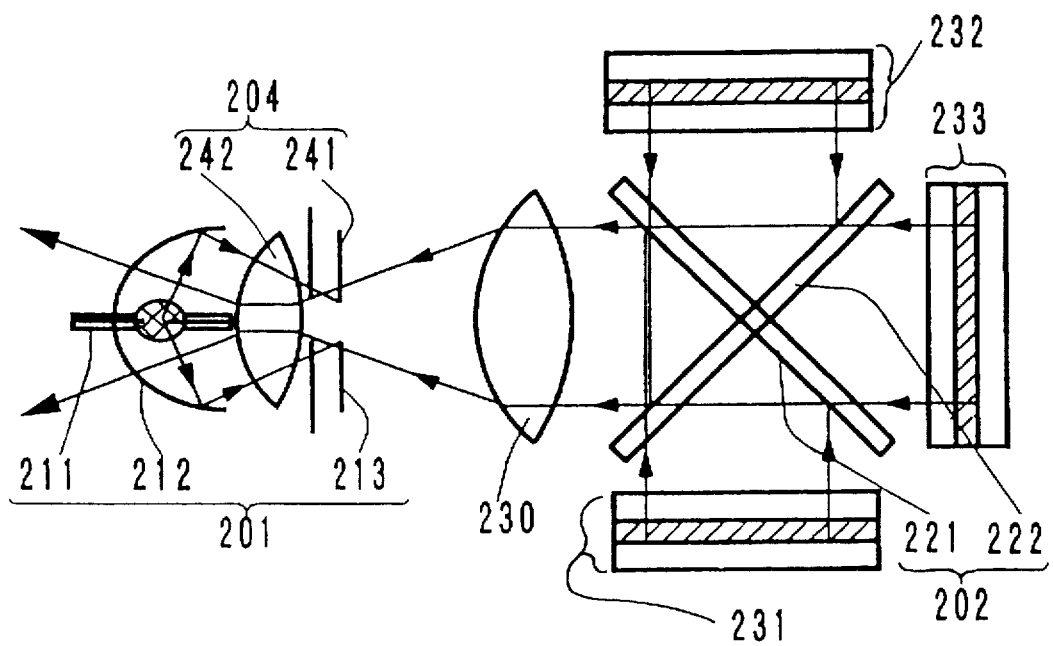

FIG. 20 is a plane view showing an embodiment of a conventional projection type liquid crystal optical apparatus using intersecting type flat plate dichroic mirrors; (light source system and projection optical system are schematically shown in partially cross-sectional view.)

Figure 21:
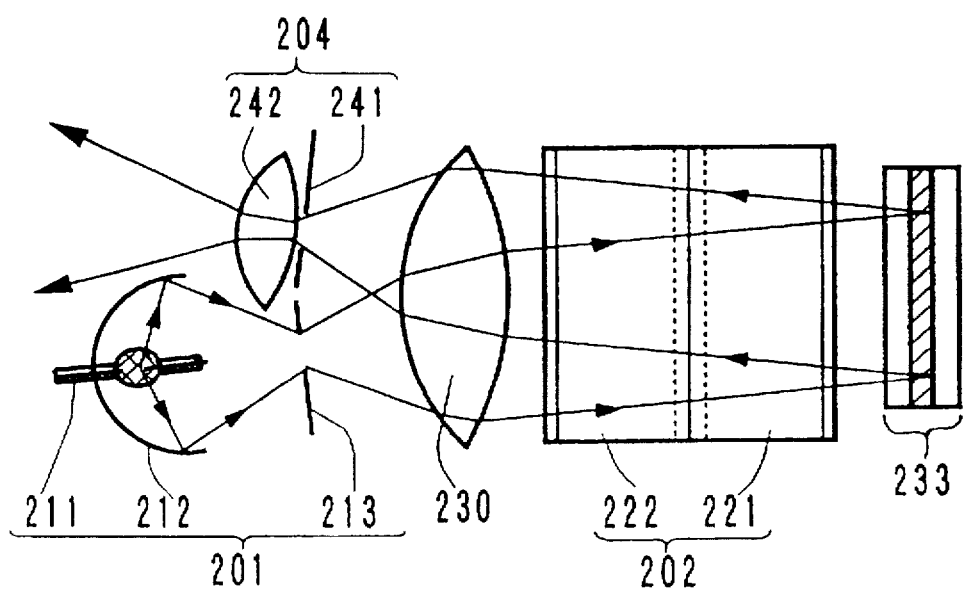

FIG. 21 is a side view showing an embodiment of the conventional projection type liquid crystal optical apparatus using the crossing type flat plate dichroic mirrors; (light source system and projection optical system are schematically shown in partially cross-sectional view.)

Figure 22:
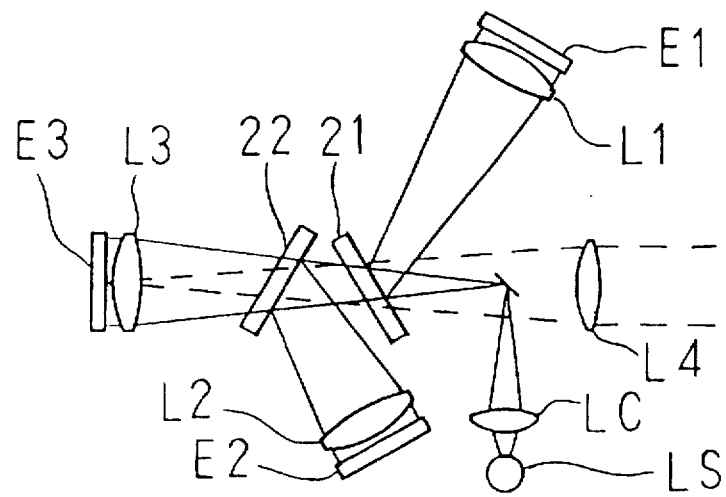
Figure 23:
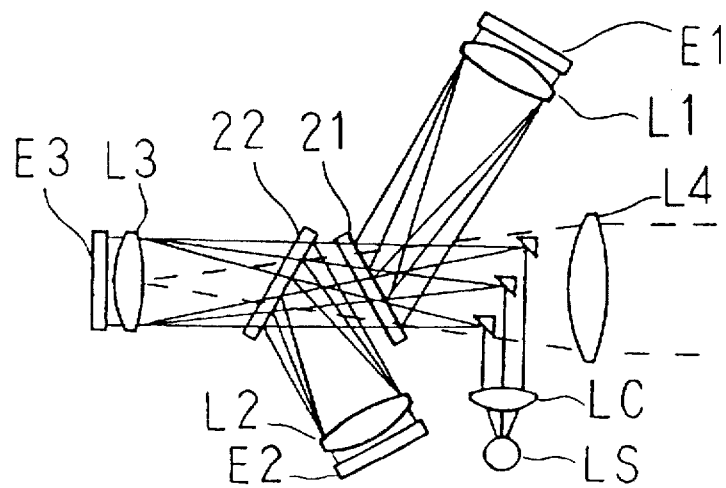
Figure 24:
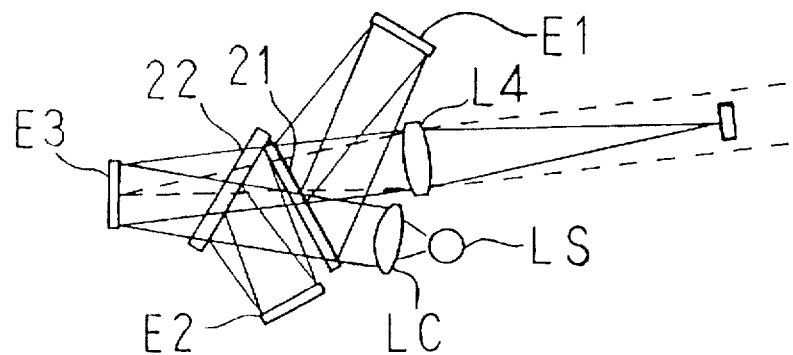

FIG. 22 is a plane view showing a first example of a conventional projection type optical apparatus using successively arranged type flat plate dichroic mirrors in a reflection type display element utilizing the deformation of a visco-elastic material;

FIG. 23 is a plane view showing a second example of a conventional projection type optical apparatus using successively arranged type flat plate dichroic mirrors in a reflection type display element utilizing the deformation of a visco-elastic material; and FIG. 24 is a plane view showing a third example of a conventional projection type optical apparatus using successively arranged type flat plate dichroic mirrors in a reflection type display element utilizing the deformation of a visco-elastic material.

Figure 25:
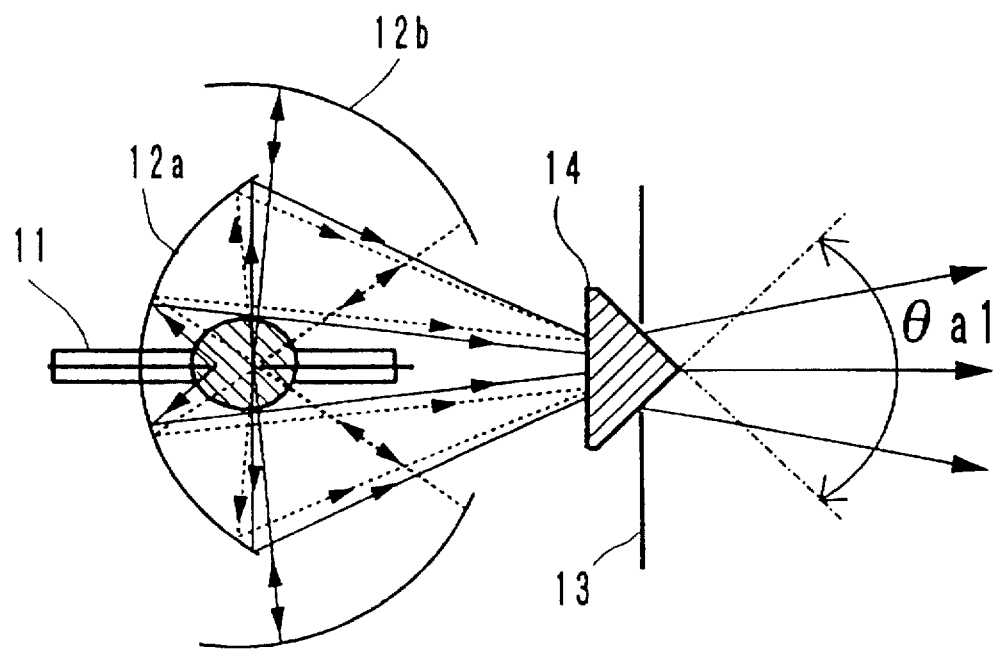
Figure 26:
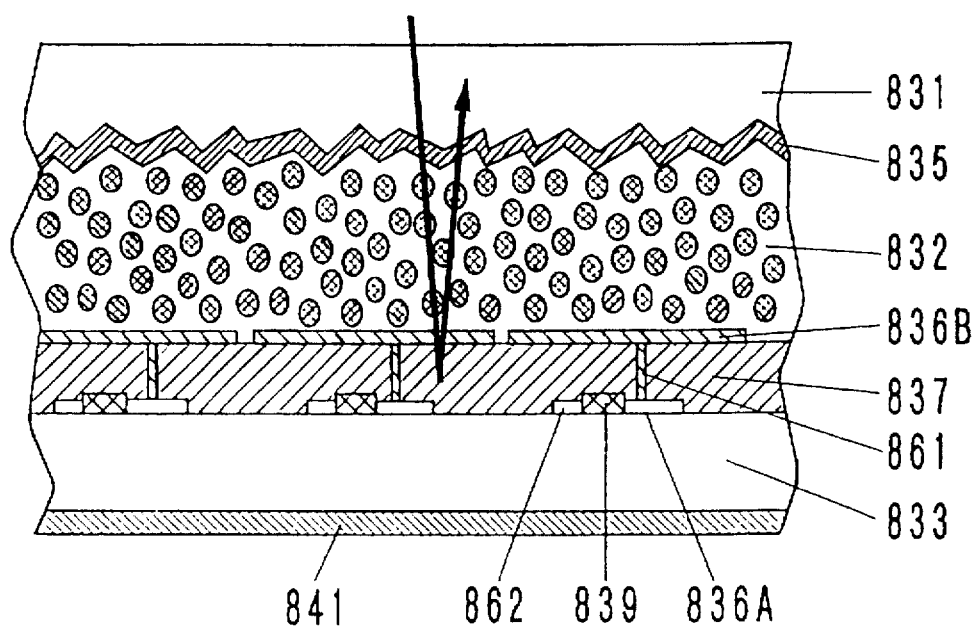
Figure 27A:
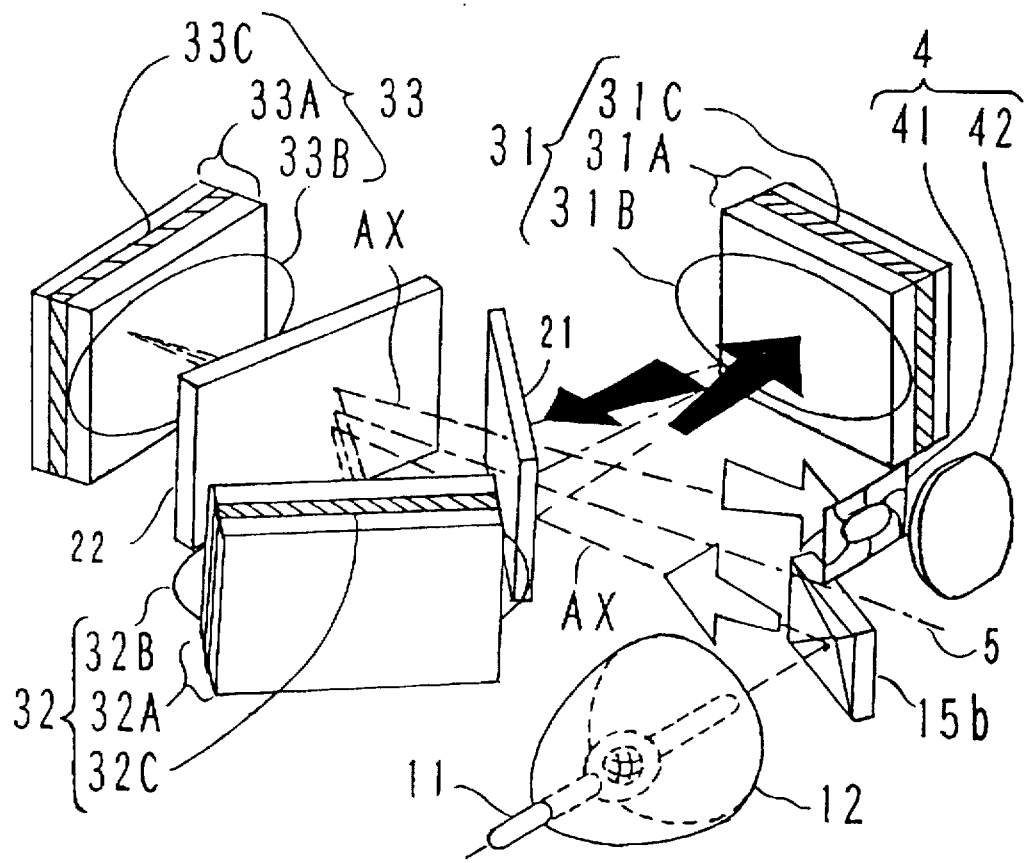

FIG. 25 is a cross-sectional view showing an embodiment of the construction of the light source system for projection according to the present invention wherein an ellipsoidal mirror and a spherical mirror are used as a light collecting mirror, and a cone-like prism (convex type) is used at a light collecting portion;

FIG. 26 is a cross-sectional view showing an embodiment of the liquid crystal optical element of the present invention wherein picture element driving electrodes of active elements are electrically connected to transparent picture element electrodes on a multi-layered dielectric film mirror through contact holes;

FIG. 27(a) is a schematically perspective view showing an embodiment of the projection type color liquid crystal optical apparatus of this invention wherein light source system (light source 11, ellipsoidal mirror 12, concave type cone-like reflector 15b), color separating and synthesizing system (dichroic mirror 21, 22), optical modulating system (reflection type liquid crystal display element 31A, 32A, 33A having liquid crystal polymer composite layer (LCPC) for light modulation by electrical signal, and with each reflection layer 31C, 32C, 33C).

Figure 27B:
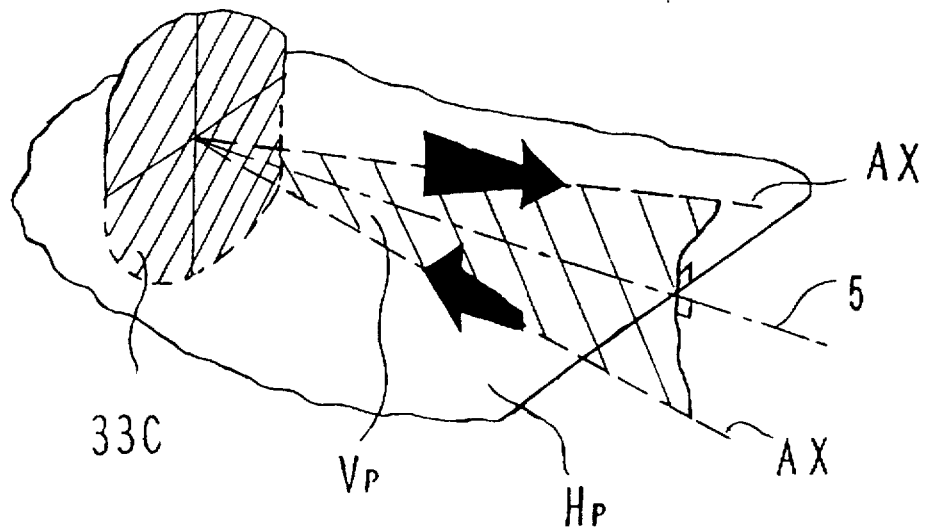

FIG. 27(b) is a schematically perspective view showing the relation of optical axis AX and central optical axis 5 and reflection layer 33C (same as 32C, 31C) and $H_p$ (Horizontal plane) and $V_p$ (Vertical plane).

Figure 28:
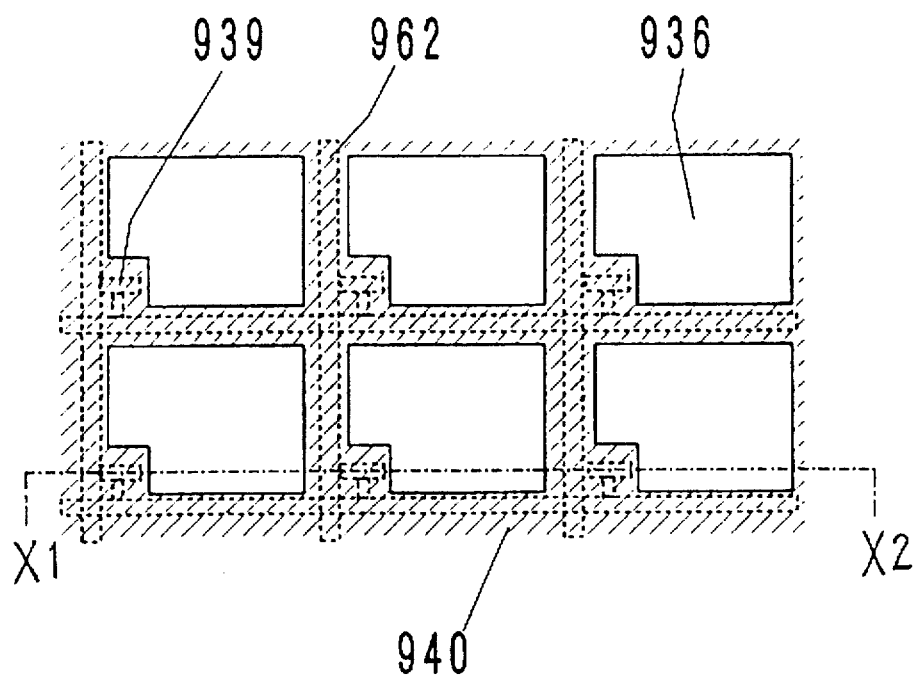
Figure 29:
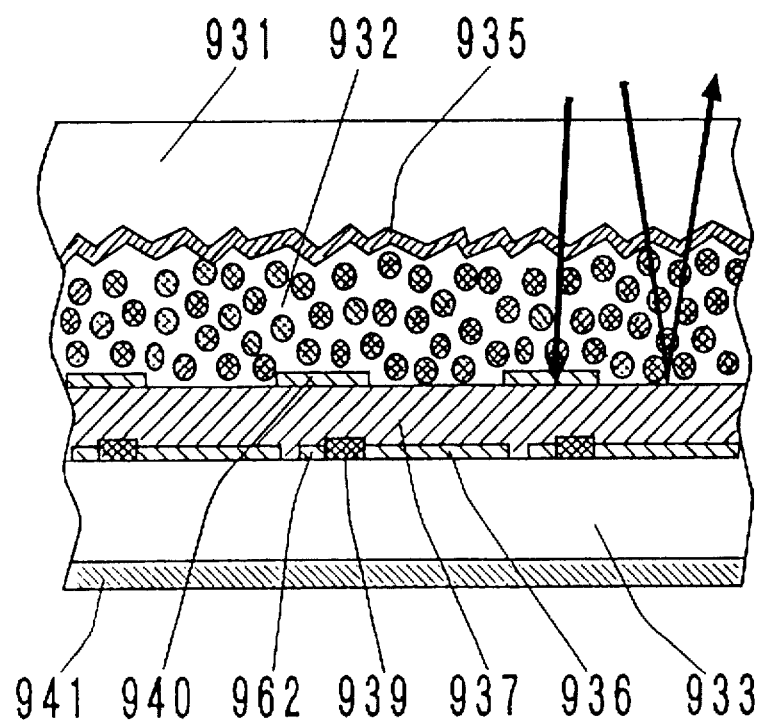
Figure 30:
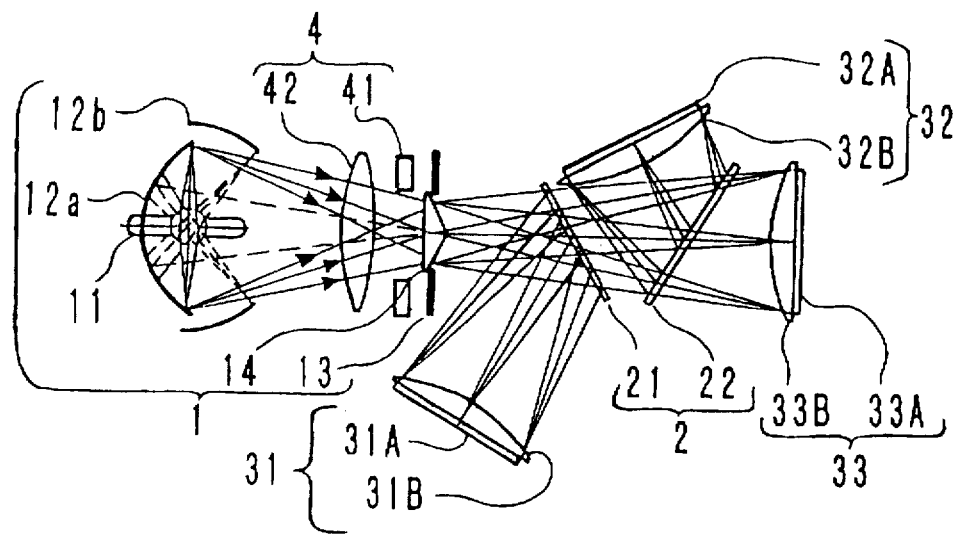
Figure 31:
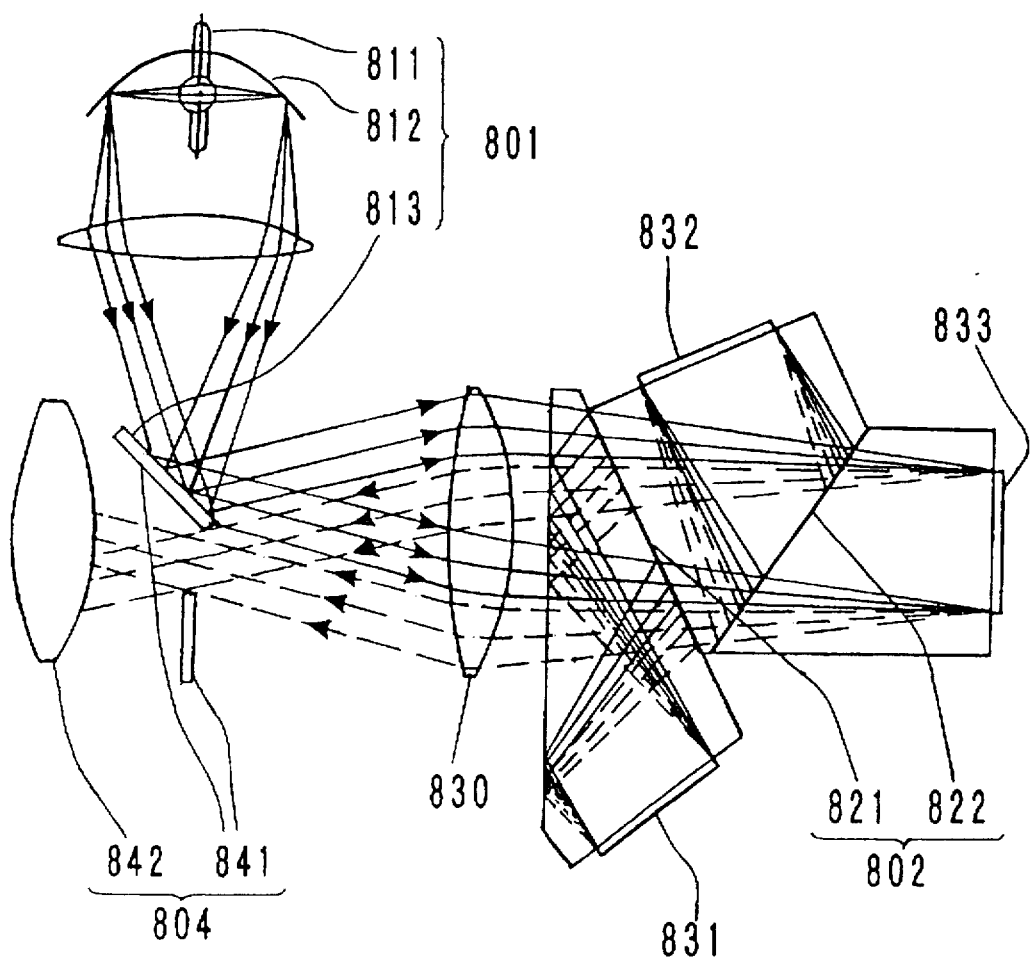

FIG. 28 is a plane view showing a black matrix-on-TFT (BM/TFT);

FIG. 29 is a cross-sectional view of the black matrix-on-TFT (BM/TFT);

FIG. 30 is a schematically plane view of an embodiment of projection type color liquid crystal optical apparatus of this invention for comparison with a comparative example (FIG. 31) with substantially same reduced scale on assuming the equivalent conditions such as same LCD panel size, same arc length and so on.) and;

FIG. 31 is a plane view showing a conventional projection type liquid crystal optical apparatus using a dichroic prism; (light source system and projection optical system are schematically shown in partially cross-sectional view.)

Some embodiments of the present invention will be described with reference to the drawings wherein the same reference numerals designate the same or corresponding parts.

Figure 1:
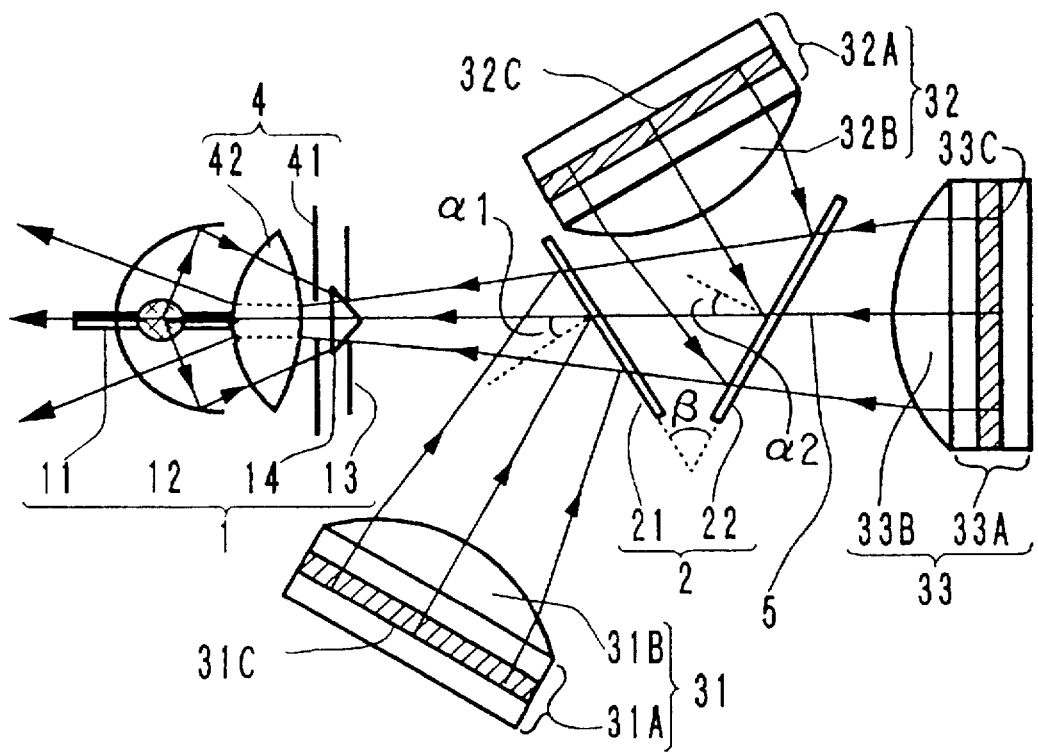
FIG. 1 is a plane view showing a construction of the projection type color liquid crystal optical apparatus according to the present invention; (light source system and projection optical system are schematically shown in partially cross-sectional view.)
Figure 2:
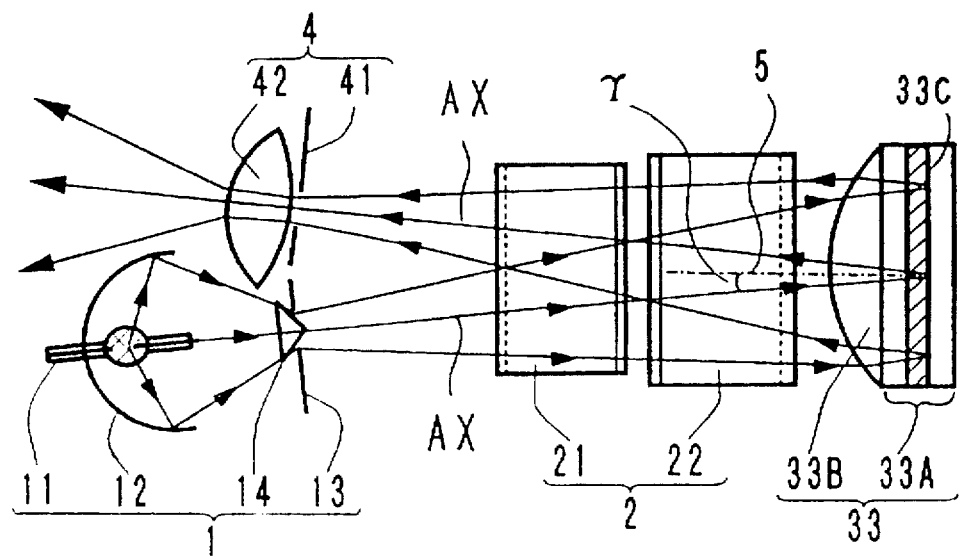
FIG. 2 is a side view showing the construction of the projection type color liquid crystal optical apparatus of the present invention (a part of structural elements is omitted); (light source system and projection optical system are schematically shown in partially cross-sectional view.)

FIG. 1 is a plane view showing a basic construction of the projection type liquid crystal optical apparatus of the present invention, and FIG. 2 is a side view showing a basic construction of the projection type liquid crystal optical apparatus of the present invention.

In FIG. 2, reflection type liquid crystal element blocks 31, 32 to which light reflected and separated by two kinds of dichroic mirrors 21, 22 enters are omitted, and only a reflection type liquid crystal element block 33 to which light transmitted through two dichroic mirrors enters and transmitted light beams are shown. The arrangement of the other two reflection type liquid crystal elements 31, 32 as well as light beams transmitted therethrough and the arrangement of the reflection type liquid crystal element 33 shown and light beams transmitted therethrough are in a mirror-surface-symmetric with respect to the reflection surface of the dichroic mirrors 21, 22 respectively.

In FIGS. 1 and 2, a light source optical system 1 comprises a lamp 11, an ellipsoidal mirror 12 and an aperture stop 13. Light emitted from the lamp 11 is reflected at the ellipsoidal mirror 12 and is collected to a position in the vicinity of the aperture stop 13. The lamp 11 and the aperture stop 13 are respectively disposed in the vicinity of the first focal point of the ellipsoidal mirror 12 and the second focal point of the ellipsoidal mirror 12. Light passing through the aperture stop 13 enters into a first flat plate type dichroic mirror 21 at which light having the wavelength band region of either one of B, G and R which are contained in visible light from the lamp 1 is reflected, and lights having the other wavelength band regions are transmitted. The remaining lights having wavelength band regions which have passed through the first flat plate type dichroic mirror 21 is entered into the second flat plate type dichroic mirror 22 at which light having the wavelength band region of either one of B, G and R is reflected and the remaining light having a wavelength band region is transmitted.

Thus, the color lights color-separated into three colors of B, G and R by the first flat plate type dichroic mirror 21 and the second flat plate type dichroic mirror 22 are incident in each condenser lens 31B, 32B, 33B so that the lights are rendered to be parallel light beams, and they are incident into transparent/scattering reflection type liquid crystal optical elements 31A, 32A and 33A comprising reflection layer 31C, 32C and 33C respectively.

For the purpose of convenience, each combination of the condenser lenses 31B, 32B, 33B and the transparent/scattering and reflection type liquid crystal optical elements 31A, 32A, 33A is represented as reflection type liquid crystal optical element blocks 31, 32 and 33.

The collimation of the incident light is modulated by the reflection type liquid crystal optical element blocks 31, 32, 33, and a degree of scattering is changed depending on a voltage applied to a liquid crystal and solidified matrix composite layer. Reflection light which is not scattered is collected again to a position in the vicinity of the focal point of each of the lenses 31B, 32B, 33B.

The three color lights of B, G and R are color-synthesized by the first and second flat plate type dichroic mirrors 21, 22, and a conjugate image corresponding to the shape of the aperture stop of the light source optical system is formed in the vicinity of the focal point of each of the condenser lenses by means of the condenser lenses 31B, 32B, 33B.

Thus, the reflection light collected passes through a second aperture stop 41, as a device for rejecting scattered light, which is disposed in the vicinity of the focal point of the condenser lenses 31b, 32B, 33B, and is projected on a screen (not shown) by means of a lens 42 of the projection optical system.

In FIGS. 1 and 2, a case that a projection optical system 4 is arranged above the light source optical system 1 is illustrated, however, these systems may be inversed. In order to incorporate a looking up or down projection mechanism in the projection type display apparatus, it is preferable to have a relation of vertical arrangement as shown in FIGS. 1 and 2 when the an eye level of an observer looking a projection image on a screen is upper than the display apparatus. However, when the eye level of the observer is lower than the display apparatus, the position of the light source optical system 1 is preferably above the projection optical system 4.

On the other hand, light scattered by the reflection type liquid crystal optical elements is not collected in the vicinity of the focal point of the condenser lenses, and is blocked by the second aperture stop 41 which is a device for rejecting scattered light, whereby the light does not pass through the projection lens and is not projected on the screen.

In the light source system 1 for the present invention, an ellipsoidal mirror is most preferably used as a light collecting mirror 12. However, a combination of a parabolic mirror, a spherical mirror, a lens and so on may be used. Further, besides a mirror of rotating single ellipsoidal shape, a multi-mirror structure wherein the surfaces of different bodies of revolution having different ellipsoidal shapes are combined in the direction of a rotating axis may be used in consideration of obtaining uniform illuminance distribution in the surface of the reflection type liquid crystal optical elements. Further, an ellipsoidal mirror and a spherical mirror may be combined to thereby increase light collecting efficiency.

As the light source (lamp) 11, a halogen lamp, a metal halide lamp, a xenon lamp or the like may be used. However, use of the metal halide lamp is preferable from the viewpoint of luminous efficacy and lifetime.

A transparent type aperture stop having an opening may be disposed in the vicinity of the focal point of a light collecting mirror, or a reflection type aperture stop having a reflection surface corresponding to an opening may be used.

Generally, a light emitting portion of a lamp has an ununiform luminance distribution. Further, a luminous intensity distribution of emission light is apt to be ununiform due to influence by the shadow of the wall of the lamp. In particular, when an ellipsoidal mirror is used as the light collecting mirror, there easily causes a shadow having a small light flux at the central portion of the surface of the reflection type liquid crystal optical elements because an amount of the emission light from the opening of the aperture stop is small at an angular region of 10° or lower with respect to the optical axis.

In order to improve the problem of uneven illuminance distribution and luminous flux density and to increase light collecting efficiency, it is effective to arrange an aperture stop and a concave or convex cone-like prism, or to arrange a concave or convex type cone-like reflector instead of the flat mirror in which a reflector having a reflection surface corresponding to the opening is used, in the vicinity of the focal point of the light collecting mirror. FIGS. 1 and 2 show a light source system using a cone-like prism 14.

Figure 3:
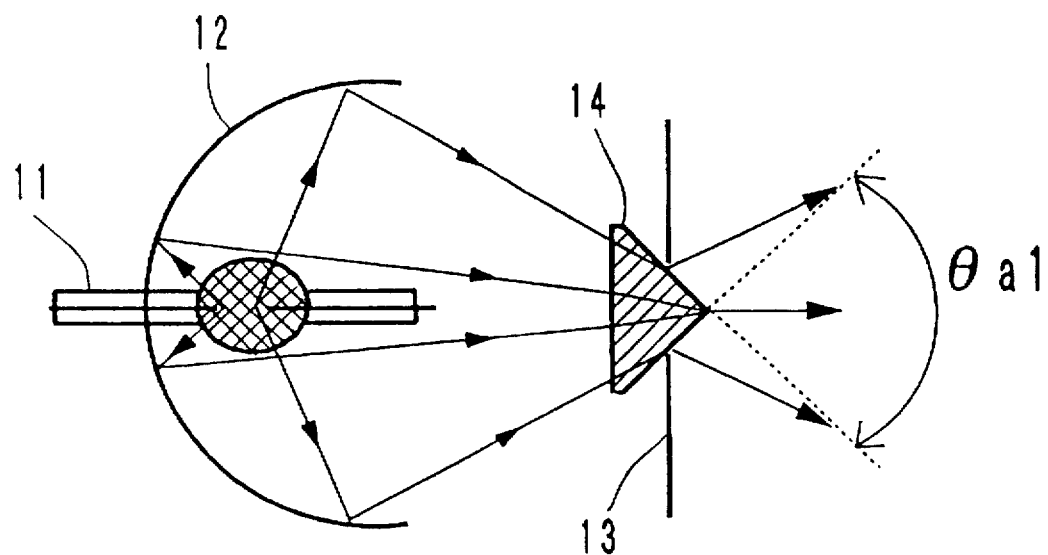
FIG. 3 is a cross-sectional view showing a part of example of a construction of a light source system for projection using a cone-like prism (convex type with vertex angle θa1) according to the present invention.
Figure 4:
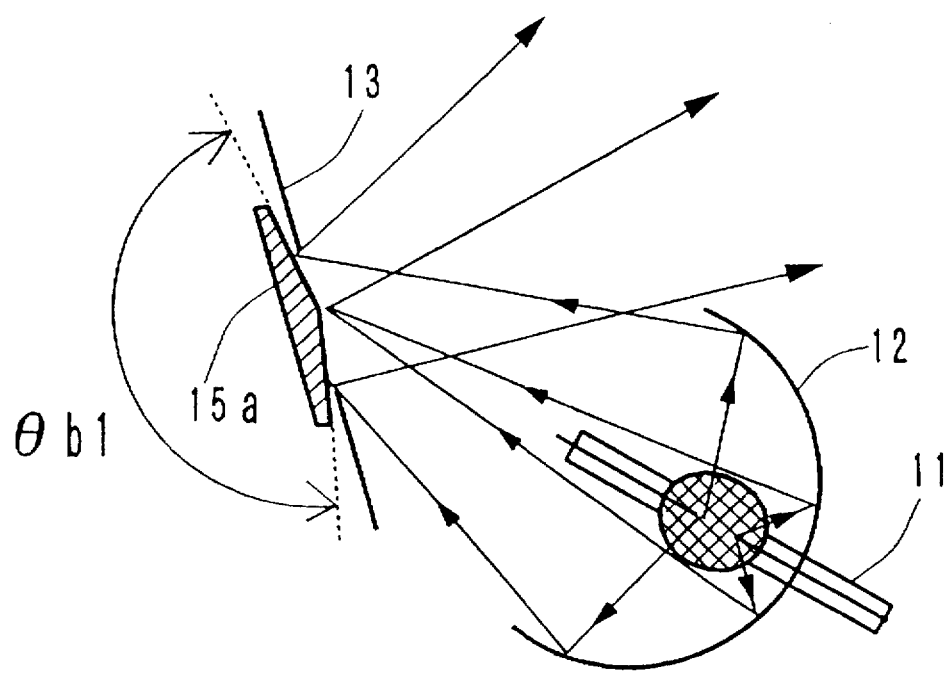
FIG. 4 is a cross-sectional view showing a part of example of a construction of a light source system for projection using a cone-like reflector (convex type with vertex angle θb1) according to the present invention.

FIG. 3 shows an example of the construction of a light source system using the cone-like prism 14 and FIG. 4 shows an example of the construction of a light source system using a cone-like reflector (convex type) 15. When the cone-like prism 14 is used, a cone-like prism having a convex surface wherein the apex angle θa1 of the light emission surface is 90°–175° or a cone-like prism having a concave surface wherein the apex angle θa2 is 185°–270° is preferably used. The apex angle of the cone-like prism is disposed on the light axis so as to be in a light axis symmetry as shown in FIG. 3. θa1 and θa2 are in a relation of supplementary angle so as to perform a similar optical function in relation to the concave or convex surface. The apex of cone-like prism may be face to lamp 11.

Further, when the cone-like reflector 15a is used, a cone-like body having a convex surface wherein the apex angle θb1 of the reflection surface is 150°–177° or a cone-like reflector having a concave surface wherein the apex angle θb2 is 183°–210° is preferably used. The apex angle of the cone-like reflector is disposed in the vicinity of the focal point of the light collecting mirror so as to have an inclination angle of 45° or lower formed between the symmetry axis of the cone-like reflector and the optical axis of the incident light. θb1 and Θb2 are in a relation of supplementary angle so as to perform a similar optical function in relation to the concave or convex surface.

In a case of using the cone-like prism as a transparent type optical element, it is preferable that an antireflection film or a heat ray cut filter is formed on the surface of it.

Further, in a case of using the cone-like reflector, the reflection surface is provided with a metallic mirror such as aluminum or the like or a dielectric multi-layered film. When the dielectric multi-layered film mirror is used, a cold mirror for permitting heat rays to pass therethrough is preferable.

Besides the above-mentioned cone-like prism or the cone-like reflector, a diffusion plate or a lens array may be disposed in the vicinity of the aperture stop in the light source optical system to have an uniform illuminance distribution in the surface of the reflection type liquid crystal optical elements of orientation. Further, a cooling system may be added to the light source system, or an heat ray cut filter or a ultraviolet ray cut filter or the like may be combined with.

Further, the cone-like prism or the cone-like reflector is not limited to a case of using only the single ellipsoidal mirror as a condenser mirror, but it is effective in a case of combining the ellipsoidal mirror with a spherical mirror to improve light collecting efficiency. The concrete structure of the above case is described with reference to FIG. 25 in which a cone-like prism is used. Unlike the structure shown in FIG. 3, the depth of an ellipsoidal mirror 12a is determined to be substantially the same as the first focal length where the light emitting portion of a lamp is disposed, and a spherical mirror 12b having its center of curvature at a position in the vicinity of the first focal point of the ellipsoidal mirror 12a is disposed at a position where the reflection surface is between the first focal point and the second focal point side of the ellipsoidal mirror. The shape of the spherical mirror 12b is such that it covers the ellipsoidal mirror 12a in the vicinity of the first focal point of the ellipsoidal mirror 12a and the opening portion for emitting light is between the first focal point and the second focal point of the ellipsoidal mirror 12a.

With such combination, the density of light fluxes emitted from the light source to the reflection type liquid crystal optical element block can be improved to thereby increase light utilization efficiency in comparison with a case of using only the ellipsoidal mirror as a light collecting mirror.

In the following, description will be made as to a color separating and synthesizing optical system. In a dichroic mirror utilizing light interface function by the dielectric multi-layered film, spectral characteristics on reflectance and transmittance exhibit an increase of difference in the spectral characteristics of an S-polarization and a P-polarization as a light incident angle is increased from 0° (i.e. light is incident perpendicularly) to an oblique incident angle.

In particular, in conventional projection type liquid crystal optical apparatuses shown in FIGS. 18, 19, 20 and 21 wherein dichroic mirrors or dichroic prisms are arranged to have an incident angle of 45°, the difference of the spectral characteristics was remarkable.

Although such disadvantage was neglected in a case of a TN type liquid crystal optical element using a polarizer by which only either linear polarization is utilized, there was a problem in a case of the projection type optical apparatus of the present invention wherein both polarization lights are utilized as projection light. The polarization dependency of the spectral characteristics of the dichroic mirrors caused deterioration of spectral effect in color separating and synthesizing function of the dichroic mirrors, i.e. the reduction of the color purity of B, G and R.

In the present invention, the first flat plate type dichroic mirror and the second flat plate type dichroic mirror in the color separating and synthesizing system are arranged without intersecting the dichroic mirrors so that each of the angles α1 and α2 formed between the optical axis in the optical system and the normal line of the surface of the dichroic mirrors is in a range of 20°–35°. Accordingly, the difference of the spectral characteristics of the S-polarization and the P-polarization is reduced and a sharp color separating effect is obtainable with the result that the color purity of each of the color lights of B, G and R is improved, in comparison with the conventional dichroic mirrors having an incident angle of 45°.

In the construction of the present invention, incident light to the dichroic mirrors is a divergent light or a convergent light, and an incident angle is difference depending on a position in the plane of the dichroic mirrors. Accordingly, a light incident angle compared with an angle formed between the optical axis in the optical system and the normal line of the surface of the dichroic mirrors becomes larger at a peripheral portion of the surface of the dichroic mirrors, and polarization dependency in the spectral characteristics is remarkable. Accordingly, when the incident light to the dichroic mirrors is a divergent light or a convergent light, there appears a clear chromatic distribution of projection light on a screen in the conventional construction having an incident angle α of 45°. Therefore, it is not suited for a projection type display apparatus which has severe demands of specifications on color-reproducibility of a displayed picture image. However, it is improved by the construction of the present invention.

Further, by giving such arrangement of the present invention as in FIGS. 1 and 2, an average value of the incident angle of each light beam takes a small value in comparison with the case that the angle α formed between the optical axis in the optical system and the normal line in the surface of the dichroic mirrors is 45°, whereby the effective surface area of the dichroic mirrors can be small; the length of a light path passing in the dichroic mirrors can be shortened, and a shift of the optical axis corresponding to the thickness of the dichroic mirrors can be reduced.

Further, since the dichroic mirrors 21, 22 are sequentially arranged without intersection, there is no problem that the shadow of the intersecting portion is projected on a screen, which was a problem in intersecting dichroic mirrors.

By arranging the mirror surface of the first dichroic mirror 21 and the surface of the second dichroic mirror 22 to have an angle β in a range from 40° to 70°, the length of the light path can be shortened in comparison with a case of a parallel arrangement (β=0°), whereby the volume of the entire projection type optical apparatus can be minimized. Further, since an amount of light scattering in a light path can be reduced, light utilization efficiency can be improved.

The plane defined by the optical axis of an incident light and the optical axis of a reflection light at the reflection surface of the reflection type liquid crystal element is arranged to be substantially perpendicular to the plane defined by the normal lines of the first and second dichroic mirrors (a plane in parallel to both the normal planes of the two dichroic mirror surfaces). Such arrangement provides an advantage that an average value of incident angles of each light beam to the dichroic mirrors can be a small value, the effective surface area of the dichroic mirrors can be small, and deterioration of the spectral characteristics of the dichroic mirrors for color separating and synthesizing due to an oblique incident angle is small, in comparison with the parallel arrangement of two planes.

In the projection type optical apparatus of the present invention, the incident angle varies depending on positions in each of the dichroic mirror surfaces, and there is difference of the spectral characteristics of the dichroic mirrors due to difference in incident angle as shown in FIGS. 1 and 2. Accordingly, when dichroic mirrors having uniform spectral characteristics in ordinary surfaces were used, an in-plane chromatic distribution of projection light on a screen was ununiform.

In order to improve such problem, in the first and second flat plate type dichroic mirrors 21, 22, the film thickness of dielectric multi-layered films is so adjusted that the spectral transmittance in the dichroic mirror surfaces has a distribution which varies depending on positions in the surfaces, whereby the difference in spectral transmittance corresponding to the difference in the light incident angle at positions in the surfaces can be reduced.

In the projection type color liquid crystal optical apparatus of the present invention, the difference in the light incident angle to the dichroic mirrors 21, 22 appears conspicuously in the direction of the intersection formed between the plane defined by the normal lines of the two dichroic mirrors and each of the dichroic mirror surface. Accordingly, the distribution can be obtained in consideration of the direction.

Such film thickness distribution forming technique for the dielectric multi-layered film has been conventionally conducted by changing the shape of a film thickness adjusting plate in a vacuum vapor deposition method, and therefore, there is practically no increase in manufacturing cost.

In FIGS. 1 and 2 showing the projection type color liquid crystal optical apparatus of the present invention, light having a red color wavelength R is reflected at the first flat plate type dichroic mirror 21, light having a blue color wavelength B is reflected at the second flat plate type dichroic mirror 22, and light having a green color wavelength G is transmitted.

The spectral characteristics of the dichroic mirrors are so determined as to have the above-mentioned specification because flexibility in designing an edge type filter such as an R-reflection or a B-reflection is high in comparison with a notch type filter such as a G-reflection, and the color purity can be easily improved.

In the projection type display apparatus using the reflection type display elements, dichroic mirror surfaces having two kinds of spectral characteristics are generally used wherein the same kind dichroic mirror surfaces function to separate color and to synthesize color. In general, in the projection type display apparatus using transparent type display elements, four kinds of dichroic mirror surfaces: two kinds for color separation and two kinds for color synthesization, are required. However, according to the present invention, color separation and synthesization becomes possible by using two kinds and two dichroic mirrors.

In a case of using an intersection type dichroic mirror or dichroic prism, the number of parts is increased in comparison with the construction of the color separating and synthesizing system of the present invention, and it is necessary to joint the parts with accuracy. Further, in order to prepare a prism, it is necessary to precisely cut and polish optical glass which is disadvantageous in terms of productivity. On the other hand, for the dichroic mirrors used for the present invention, the same material as the conventional flat plate type dichroic mirror is used. Accordingly, good quality and a necessary quantity are easily obtainable.

When the same dichroic mirror surface is used twice at the time of color separation and color synthesization, the final spectral transmitting (reflecting) characteristics correspond to the square of a value obtained in the case of one time. Accordingly, the color purity can be improved in comparison with the case of one-time transmission (reflection). However, when the sharpness of the spectral characteristics in the wavelength of color separation in the case of one-time transmission is low, the light of an intermediate wavelength region which is between a transmitting wavelength region and a reflecting wavelength region is eliminated so that the light can not be utilized as projection light. Accordingly, when the sharpness of the spectral characteristics in the wavelength of color separation obtained by a conventional 45° incidence dichroic mirror is low, the color purity is low and an amount of projection light is also low.

In a case of the projection type display apparatus of the present invention, since the incident angle of light entering into the flat plate type dichroic mirrors 21, 22 is small as 20°–35° in comparison with 45° in FIG. 1, high sharpness of the spectral characteristic with respect to color separation and color synthesization can be maintained for randomly polarized incident light. As a result, a loss of light in an intermediate wavelength region between the transmitting wavelength region and the reflecting wavelength region can be suppressed to be low; a high color purity is obtainable, and an amount of projection light can be increased.

Further, by using the projection type display apparatus of the present invention, it is possible to obtain the color purity of projection light comparable to a CRT by the color separation and synthesization system which is constituted by only two kinds and two dichroic mirrors.

The apparatus for rejecting scattered light in the present invention can be disposed in front or rear of a projection lens in the projection optical system or between a plurality of lenses constituting a projection lens, in combination of the projection optical system. The apparatus for rejecting scattered light may be a second aperture stop 41 corresponding to a conjugate image of the shape of the aperture stop 13 in the light source optical system, or may be a reflection plate having a corresponding effective surface.

Further, the second aperture stop may be disposed separately from the projection lens, or may be made in one piece in the same manner as a camera lens. In view of the shrinkage of the optical path length and miniaturization, a construction that a conjugate image corresponding to the shape of an aperture stop in the light source optical system is focused at the position of the pupil in a projection lens, a second aperture stop is arranged at the focused position, and a projection optical system and a scattered light rejection system are formed in one block, is preferable. Further, the aperture of the projection lens may be selected to reject scattered light without using a special aperture or the like.

For the projection optical system, a conventional projection optical system comprising a lens or the like in which a device for rejecting scattered light is combined with the projection optical system is used. As the device for rejecting scattered light, it is preferable to use such a device that in an amount of light passing through the liquid crystal optical element, a straight-forward light with respect to incident light (light which has transmitted through portions in which picture element portions are in a transparent state and has been specularly reflected at a back side reflection surface) is taken, and a non-straight-forward light (light scattered at portions in which liquid crystal and solidified matrix composite is in a scattering state) is rejected. In particular, the device which does not reject the straight-forward light but reject scattered light which is reflected without straightly propagated, is preferred.

In order to improve visibility to projection light, it is preferable to use a mechanism capable of changing with cooperation both the opening area of the aperture stop 13 in the light source system and the opening area of the second aperture stop 41 which is disposed in the vicinity of a projection lens as a scattered light rejecting system, whereby an amount of projection light luminous flux and the contrast ratio can be controlled depending on brightness in atmosphere.

The conventional projection type display apparatus shown in FIGS. 18 through 21 and 31 has such a construction that a picture image of the reflection type liquid crystal display element is projected on the screen by means of the projection lens and the condenser lens wherein the liquid crystal display element, the color separating and synthesizing system, the condenser lens and the projection lens are separately disposed.

On the other hand, in the optical system of the present invention shown in FIG. 1, three lenses 31B, 32B, 33B are respectively used for three liquid crystal display elements instead of the conventional single condenser lens 130, 230 or 830. As a result, the color separating and synthesizing system is disposed between the condenser lenses and the projection lens whereby substantial miniaturization can be achieved in comparison with the conventional structure wherein the color separating and synthesizing system is disposed between the condenser lenses and the liquid crystal display element. Further, in a light path from the light source system to the condenser lenses, there is no substantial amount of escaping light to the liquid crystal display elements, and there is a little amount of stray light in the light path. Therefore, a bright projection image having a high contrast ratio can be obtained.

In the next, several embodiments of the construction of the reflection type liquid crystal optical element of the present invention are shown in FIGS. 5 through 12. A reflecting layers 337 or 339 in the reflection type liquid crystal optical element may be a metallic reflection film such as aluminum, silver, chromium or the like, or it may be formed of a dielectric multi-layered reflection surface which is formed by depositing light/transmitting dielectric thin films having a relatively high refractive index and light/transmitting dielectric thin films having a relatively low refractive index alternately on the substrate.

As the light/transmitting dielectric thin film having a low refractive index, there are $SiO_2$, $MgF_2$, $Na_3AlF_6$ and so on, and as the light transparent dielectric thin film having a high refractive index, there are $TiO_2$, $ZrO_2$, $Ta_2O_5$, ZnS, ZnSe, ZnTe, Si, Ge, $Y_2O_3$, $Al_2O_3$ and so on. In comparison with the metallic reflection film, a mirror of the dielectric multi-layered film has advantages that there is flexibility of capable of adjusting the spectral reflection characteristic by changing material, the number of layers and film thickness, and a reflectance as high as nearly 100% can be achieved by increasing the number of layers.

As shown in FIG. 5, a reflecting layer 339 may be disposed between a back electrode substrate 333 and a liquid crystal and solidified matrix composite 332. In this case, use of a metallic film can function as a back electrode and a reflecting layer. However, in a case of a mirror of a dielectric multi-layered film, a transparent electrode film should be a constituent for the multi-layered film.

Further, as shown in FIG. 6, the reflecting layer 337 may be formed at the opposite side of the back electrode substrate 333 where transparent electrode 336 is formed in a transparent type liquid crystal optical element, or as shown in FIG. 7, a substrate 338 attached with the reflecting layer 337 may be arranged in rear of the back electrode substrate 333.

In a case of a display element wherein the reflection type liquid crystal type optical element comprises sufficiently small picture elements in comparison with the thickness of the back electrode substrate 333, it is preferable to use the construction shown in FIG. 5 where a reflecting layer is formed between the back electrode substrate 333 and the liquid crystal and solidified matrix composite 332 whereby deterioration in resolution of a projected picture image due to the production of double image can be eliminated.

In the construction shown in FIG. 5, the back electrode substrate 333 is not always of a light transparent material. Accordingly, besides glass or plastics, Si, Ge which allow integration of a semiconductor circuit on a substrate, a semiconductor substrate such as GaAs or the like which allows the formation of a light emission element or a sintered body such as ceramics may be used.

Further, in the construction of FIG. 5, the reflecting layer 339 should have function as a back electrode. When the reflecting layer is of a metallic electrode reflection film made of aluminum, silver, chromium or the like, it functions as a reflection surface as well as the back electrode. However, scratches are easily caused by a gap controlling spacer because the film has a soft front surface, whereby it easily causes reduction of reflectance.

On the other hand, when a reflection film in combination of the dielectric multi-layered film and a transparent electrode such as $In_2O_3$—$SnO_2$ (ITO), $SnO_2$ or the like is formed between the back electrode substrate and the liquid crystal and solidified matrix composite, flatness and durability are superior to those of the metallic film, and the color purity of each color lights can be improved since it has wavelength selecting and reflecting properties in the same manner as the dichroic mirror.

In particular, when a white color lamp having a high color rendering property is used to separate light into three colors of R, G and B and synthesize the three colors by using the before-mentioned first flat plate type dichroic mirror and the second dichroic mirror, it is known that the color purity is substantially deteriorated when light having a wavelength band region of 570 nm–590 nm is mixed with a wavelength band region of green or red. Such light having needless wavelength band regions can not be basically separated by the two dichroic mirrors. However, deterioration of the color purity of green of red can be improved by using a reflection type liquid crystal optical element in which a dielectric multi-layered film having the spectral characteristics to transmit light having such wavelength region is formed.

When the reflection layer 339 is of a metallic electrode reflection film, it is preferable to use additionally light absorbing type optical filter in order to improve the color purity of each color lights. For example, a color filter glass which absorbs the spectrum light below 590 nm wavelength may be disposed between a liquid crystal optical element for RED and its DM.

In the construction of the reflection type liquid crystal optical element in FIG. 5, when the back electrode 339 comprises patterned picture element electrodes, active elements such as TFTs, thin film diodes, MIMs or the like are connected if necessary. In order to reduce undesirable reflection, the active elements are preferably disposed on the back electrode substrate 333 and the surface facing to the liquid crystal and solidified matrix composite of the back electrode substrate should be flat as possible to reduce diffuse reflection.

When the dielectric multi-layered film is used as a reflecting layer for the back electrode, there are two kinds of positional relation between the back electrode on a back electrode substrate and a reflection film formed of the dielectric multi-layered film. Namely, the first case is such that a reflection film of the dielectric multi-layered film is formed on the back electrode substrate with the back electrode, and the second case is such that the back electrode is formed on the back electrode substrate with a reflection film of the dielectric multi-layered film.

Although the former can be applied to all the back electrode substrate and the back electrode, the later can not be applied to those when a Si single crystal is used for a back substrate and an active element is formed for each picture element in the substrate, and it is necessary to connect to a junction of the circuit of the active element (for instance, any one of the electrodes of a three terminal structure). Specifically, it is preferable to connect a picture element driving electrode to a picture electrode on a multi-layered dielectric film.

However, since the active element such as TFT is generally formed on a glass substrate, there is no problem that the TFT is formed on the dielectric multi-layered film which is formed on the glass substrate. Further, in the later case, the back electrode is a transparent electrode.

Further, from the viewpoint of low voltage driving wherein a voltage is directly applied to the liquid crystal and solidified matrix composite, the back electrode is preferably formed on the reflection film made of the dielectric multi-layered film. In this case, when the active element is formed for each back electrode, the uppermost film which is in contact with the active element of the reflection film of the dielectric multi-layered film is preferably formed of material which is non-reactive at the interface. For this purpose, an oxide of dielectric material such as $SiO_2$, $TiO_2$, $ZrO_2$, $Ta_2O_5$, $Al_2O_3$ or the like are preferable.

On the other hand, when the reflection film of the dielectric multi-layered film is formed on the back electrode substrate on which back electrodes and active elements are formed, a part of a voltage applied to the reflection film of the dielectric multi-layered film is consumed. As a result, even though an effective driving voltage is increased, the dielectric multi-layered film works as a protective film for the electrodes and the active elements.

In order to reduce a voltage loss in the multi-layered dielectric film and improve the picture element aperture ratio, contact holes should be formed in the multi-layered dielectric film, and then, picture electrodes should be formed on the multi-layered dielectric film, whereby the picture element driving electrodes for the active elements are connected to the picture electrodes on the multi-layered dielectric film.

Further, when the active element is formed for each back electrode, the reflection film functions as a light blocking film to prevent incident light entering to the reflection type liquid crystal optical element from reaching directly the active element. As a result, even when an active element such as amorphous Si or the like having a large photoconductive effect is used, a light-induced current can be reduced without separately forming a light blocking layer.

Further, in order to increase the light blocking property, a light blocking layer may be formed on the dielectric multi-layered film on the side of the back electrode substrate at the position corresponding to each active element. In order to suppress generation of an additional capacitance, the light blocking layer is preferably formed of material other than metal, which has a small electric conductivity, for instance, a photo-sensitive black polymer, Si, Ge, CdTe or the like can be used. In this case, since the dielectric multi-layered film serves as a protective film for the active element, there is high reliability for the active element even when an alkali developer liquid is used for patterning by wet etching.

On the other hand, a light blocking metallic film such as a Cr film may be formed through an insulating film on the back electrode substrate at only position of each of the active elements, and then, a reflection surface of the multi-layered dielectric film be formed on the metallic film.

In the construction of the reflection type liquid crystal optical element shown in FIGS. 5 and 6, temperature adjustment can be easy because the liquid crystal and solidified matrix composite layer can be directly heated or cooled from the side of the back electrode substrate 333, and the liquid crystal and solidified matrix composite can be maintained at the optimum working temperature range. Specifically, the back electrode substrate is forcibly temperature-adjusted by combining a heater, a Peltier element, a radiator plate, a cooling fan, a thermometer and so on.

In the construction of the reflection type liquid crystal optical element shown in FIG. 5, a optical addressing type spatial light modulator may be formed by uniformly forming transparent electrodes on a light transmitting substrate so as to obtain a back electrode substrate, by forming a photoconductive film on the back electrode substrate, and forming a dielectric multi-layered film mirror on the photoconductive film. In this case, the back electrode and the photo-conductive layer are used without patterning.

As material for the photo-conductive film, amorphous Si, polycrystal Si, singlecrystal Si, BSO ($Bi_{12}SiO_{20}$), GaAs, CdS, Se or the like may be used. Further, when the intensity of an incident light to the reflection type liquid crystal display element is high and a part of the light transmitting through the dielectric multi-layered film mirror excites the photo-conductive film, it is preferable to form a non-electric conductive light absorbing layer between the dielectric multi-layered film mirror and the photo-conductive layer.

When the optical addressing type spatial light modulator is used as a reflection type liquid crystal display element, it is necessary to introduce light from the side of the photoconductive film by a light addressing means. Generally, a CRT or a transparent type liquid crystal display element (LCD) or the like is used as a picture image input means.

A picture image formed by the CRT or the LCD may be focused on the photo-conductive layer by means of a lens. Further, for miniaturization, a face plate for a picture image producing element and a fiber array plate (FAP) as a back electrode substrate for the spatial light modulator may be used wherein they are bonded with a refractive index matching oil or an adhesive. In this case, in order to further simplify the construction, the face plate for CRT or LCD and the back electrode substrate for a spatial light modulator can be common fiber array plates (FAP) whereby two FAPs bonded together prevent deterioration of resolution.

Further, in the construction of the reflection type liquid crystal optical element shown in FIG. 5, CTP may be used as the back electrode substrate. An example of a spatial light modulator using the CTP is described in, "Applied Optics Vol. 31, No. 20, 1992, page 3971–3979: Charge-transfer-plate spatial light modulator".

The CTP has a construction that a large number of thin conductive wires are densely embedded in a substrate of insulating material so that electric charges having a two dimensional distribution or a voltage distribution formed in a single surface of the CTP is transferred to the other surface of the CTP. A dielectric multi-layered film mirror may be formed at one side of the CTP to use it as the back electrode substrate 333 of the reflection type liquid crystal display element.

As a method of applying a voltage, a photo-conductive material such as the before-mentioned amorphous Si film is formed on a surface where the dielectric multi-layered film mirror is not formed; a transparent electrode is formed on the photo-conductive material; and then, a specified a.c. voltage is applied across the transparent electrode and an electrode on a front electrode substrate 331, whereby a light addressing type reflection type spatial light modulator is realized.

As another method of applying a voltage, an active matrix substrate may be bonded to a side of the CTP by means of a bump-bond, or a picture image information voltage may be directly applied to the liquid crystal and solidified matrix composite layer through the CTP by scanning electric charges on the surface of the CTP in combination with an electron gun used for a CRT and an electron lens, which are disposed at a side of the CTP.

In a case of applying a voltage to the liquid crystal and solidified matrix composite layer through the charge transfer plate, the voltage is applied only to a conductive wire portion in the charge transfer plate, and accordingly, an effective surface area of the picture element is reduced when the surface area occupied by the conductive wire is small. As a result, light utilization efficiency is decreased.

In order to eliminate such problem, it is desirable to form picture element electrodes on a surface of the charge transfer plate, and then, the multi-layered dielectric film mirror is formed on the picture element electrodes. With this construction, a voltage applied from the opposite side of the charge transfer plate is applied to the picture element electrodes through the conductive wire of the charge transfer plate, and accordingly, the light utilization efficiency is not decreased when the surface area of the picture element electrodes is large.

A front electrode substrate 331 of the reflection type liquid crystal optical element is a transparent substrate such as glass, plastics or the like, on the inner surface of which a transparent electrode 335 such as $In_2O_3$—$SnO_2$ (ITO), $SnO_2$ or the like is formed in a form of flat electrode in general. When the front electrode substrate 331 has a surface contacting air, it is preferable to form an antireflection film 334 at the interface to thereby reduce a specular reflection component.

When a transparent electrode interface in a front electrode substrate and a reflecting layer in a back electrode substrate is in parallel to each other in the reflection type liquid crystal optical element, a specular reflection component of incident light produced at the transparent electrode interface overlaps with reflection light caused at the reflection surface. Accordingly, a black level in a projected light does not have a small value, with the result of a low contrast ratio.

As one of measures to improve the deterioration of contrast ratio due to the specular reflection at a front electrode interface, it is effective not to form the front electrode interface and the reflecting layer in parallel. Specifically, as shown in FIG. 8, a minute concave-convex portion is formed in the interface of a front transparent electrode film 435 to thereby cause diffuse reflection, and light is blocked by a second aperture stop in a scattered light rejection optical system so as to prevent light from reaching a screen.

Also, the hysterisys which is the drawback of liquid crystal and polymer composite layer is substantially reduced.

In order to form the uneven portion i.e. minute concave and convex for the purpose described above, it is preferable to form a saw-like portion having a small flat plane and having many slant planes. Rectangular-like concave and convex are not preferable because there are a much amount of flat planes. The minute concave and convex may be formed by polishing, sand-blasting using fine particles, etching with use of chemicals or melt-bonding silica particles.

Although a polishing method is suitable to uniformly form the minute uneven surface having a high light diffusion property on the entire surface of the substrate, a sandblast method is suitable in a case that the minute uneven surface is formed at only a working surface of the front electrode substrate of the liquid crystal optical element and the other surface portion is left as a transparent flat plane. In particular, when a display element in which liquid crystal optical element are constituted by picture element electrodes is to be prepared wherein the patterning of a light blocking film such as a black matrix is formed in a front electrode substrate and position-matching is required for picture elements at a back electrode substrate side, the portion other than the display plane should be a transparent flat surface for easy position-matching for a back electrode substrate. Further, it is preferable that a sealing portion has a flat plane to prevent the mixing of bubbles.

As shown in FIG. 9, alternatively, a multi-layered antireflection film 439 may be formed by combining the front transparent electrode film 435 with a single-layered or a multi-layered dielectric film 434 having a different refractive index such as $SiO_2$, $TiO_2$, $ZrO_2$, $MgF_2$, $Al_2O_3$, $CeF_3$ or, polyimide or the like.

As another measures, as shown in FIG. 10, a substrate 438 with a reflecting layer 437, as a reflecting means, is separately disposed in rear of a transparent type liquid crystal optical element so that the transparent type liquid crystal optical element is inclined to the reflecting layer 437, whereby light reflected at the interface of the transparent type liquid crystal optical element is blocked by a second aperture stop in a scattered light rejection optical system so as to prevent light from reaching a screen.

In particular, when the reflection type liquid crystal optical element is a display element formed of small picture elements in comparison with the thickness of a back electrode substrate, it is preferable to form a minute concave-convex portion at the interface to an ITO electrode of the front electrode substrate and to form a reflecting layer between the back electrode substrate and a liquid crystal and solidified matrix composite whereby the deterioration of resolution is not caused. Or, specular reflection at the interface may be reduced by forming a multi-layered antireflection film in which ITO is used as a constituent.

In the projection type liquid crystal optical apparatus shown in FIGS. 1 and 2, light emitted from the light source system 1 is rendered to be substantially parallel light beams by means of condenser lenses 31B, 32B, 33B which are respectively disposed between the color separating and synthesizing optical system 2 (two flat plate type dichroic mirrors) and each of the reflection type liquid crystal optical elements 31A, 32A, 33A; the parallel light beams are introduced into the reflection type liquid crystal optical elements 31A, 32A, 33A; each reflection light is collected again by means of each of the condenser lenses 31B, 32B, 33B; and a conjugate image similar to the shape of the aperture 13 disposed in the vicinity of the second focal point of the ellipsoidal mirror is formed in a non-overlapping state apart from the position of the opening in the vicinity of the second focal point of the ellipsoidal mirror.

For the three condenser lenses 31B, 32B, 33B, plano-convex lenses are usually used. In this case, it is preferable that the convex surface of each of the lenses faces the reflection type liquid crystal optical element in order to reduce aberration. In this case, however, it is preferable to form an antireflection film on both surfaces of the lenses because surface reflection occurs at the interface between the both surfaces of the lenses and air at the light incident side of the reflection type liquid crystal optical elements.

When the three plano-convex lenses 31B, 32B, 33B are so arranged that the flat surface sides face the reflection type liquid crystal optical elements respectively, reflection at two interfaces can be substantially reduced by joining each of the lenses and each of the reflection type liquid crystal optical elements by means of an optical adhesive agent or a refractive index matching oil or the like. In this case, it is unnecessary to form an antireflection film at the interface between the reflection type liquid crystal optical elements 31A, 32A, 33A and air, and the antireflection film can be formed at only the convex surface side of the lenses. FIGS. 1 and 2 show such construction.

In the projection type liquid crystal optical apparatus of the present invention, other constructions concerning the reflection type liquid crystal optical element are shown in FIGS. 11 and 12.

Namely, there are shown reflection type liquid crystal optical elements wherein both functions of converging and reflecting light are performed in a unit by using transparent electrodes for a front electrode substrate 531 and a back electrode substrate 533 which hold the liquid crystal and solidified matrix composite and by disposing a reflection type light converging layer 537 at the side where transparent electrode of the back electrode substrate 533 is not formed (i.e. opposite side). In this case, the condenser lenses 31B, 32B, 33B in FIGS. 1 and 2 are unnecessary. The reflection type light converging layer is called as a whole a light converging and reflecting means.

The reflection type light converging layer is provided by forming a reflecting layer on a non-flat surface such as a spherical surface or an ellipsoidal surface. In a case of a spherical surface mirror, when an aperture stop of a light source optical system is disposed at a position slightly away from the center of the spherical body, incident light is focused as a conjugate image of the aperture stop of the light source system at a position slightly apart from the center of the spherical body after it has been reflected on the spherical surface mirror.

Further, in a case of an ellipsoidal surface mirror, when an aperture stop of a light source system is disposed in the vicinity of the first focal point of an ellipsoidal surface body, incident light is focused as a conjugate image of the aperture stop of the light source system in the vicinity of the second focal point of the ellipsoidal surface body after it has been reflected on the ellipsoidal surface mirror.

The above-mentioned reflection type light converging layer may be unified with the back electrode substrate 533 as shown in FIG. 11 or may be separated with it as shown in FIG. 12, with respect to a transparent type liquid crystal optical element comprising the front electrode substrate and the back electrode substrate which hold the liquid crystal and solidified matrix composite.

In a case of unification, a reflecting layer may be formed on a convex surface of a plano-convex lens 537 and a transparent electrode 536 is formed on a flat surface so as to form the back electrode substrate 533, or a plano-convex reflecting mirror in which a reflecting mirror is formed on a convex surface of the plano-convex lens may be bonded to the transparent type liquid crystal optical element.

A unified type is advantageous in light utilization and contrast ratio in comparison with a separate type because reflection at the interface is reduced, as shown in FIG. 12. Further, it is preferable to form an antireflection film at the interface between portions other than the reflecting layer and air.

In a case of the display element shown in FIGS. 11 and 12 wherein the transparent electrodes of the reflection type liquid crystal optical element are constituted by picture elements, if the liquid crystal and solidified matrix composite layer 532 as a light modulating layer and the light converging and reflecting layer 537 are disposed with a distance longer than the length of the picture element, double images are undesirably formed in a projected image.

In such a case, accordingly, it is necessary to reduce the distance between the liquid crystal and solidified matrix composite layer 532 and the reflecting layer 537 by forming the reflection surface to have a Fresnel lens-like shape or the like.

In the projection type liquid crystal optical apparatus using the reflection type liquid crystal optical element shown in FIGS. 11 and 12, other structural elements are the same as those in FIGS. 1 and 2.

The operation of the projection type color liquid crystal optical apparatus of the present invention in which a liquid crystal optical element holding a liquid crystal and solidified matrix composite showing a scattering state under a condition of non-application of a voltage, will be described.

When a portion of the reflection type liquid crystal type optical element is in a transparent state, light passes through it and reflects on a reflection film so as to emit with specular reflection. Since straight-forward light passes through a device for rejecting scattered light, a bright display is obtainable on a projection screen.

On the other hand, light is scattered in a portion in a scattering state so that the light is emitted as scattered light. Since the scattered light can not pass through the device for rejecting scattered light, it looks dark on the projection screen.

In the present invention, since light reaching the backside of the reflection type liquid crystal optical element in a portion in a scattering state is reflected at the reflection surface and then, passed through the scattering portion again. Accordingly, light is further scattered as a result of obtaining a high scattering ability in a thin liquid crystal and solidified matrix composite layer. Further, when it has the same scattering ability with respect to a transmission type liquid crystal optical element, a driving voltage can be lowered because the liquid crystal and solidified matrix composite layer can be thin.

In the present invention, the liquid crystal and solidified matrix composite comprises a solidified matrix such as polymer in which a large number of fine holes are formed and liquid crystal is filled in the holes wherein the refractive index of the solidified matrix is substantially in coincident with the refractive index of the liquid crystal used in either state of the application or non-application of a voltage. The detail about liquid crystal and solidified matrix composite structure or manufacturing method is described in U.S. Pat. No. 4,834,509/EP272585, U.S. Pat. No. 4,818,070/EP275999, U.S. Pat. No. 5,150,232/EP362776, U.S. Pat. No. 5,162,934, U.S. Pat. No. 5,103,327/EP468529, U.S. Pat. No. 5,216,531/EP473090, U.S. Pat. No. 5,196,952/EP505964 and U.S. Pat. No. 5,235,445/EP509534. Also in this present invention, NCAP or PDLC devices can be applied for liquid crystal optical element.

The refractive index anisotropy $\Delta n$ ($=n_e-n_o$) of the liquid crystal used should have a large value to some extent in order that it contributes the scattering ability and a high scattering ability is obtained. Specifically, $\Delta n>0.18$ is preferred, in particular, $\Delta n>0.20$ is preferred. Further, $0.21\leq\Delta n\leq0.25$ is more preferred, and $\Delta\epsilon$ is in the range of 5–13, preferably 5–11.6. Further, it is preferable that $n_o$ of the liquid crystal used substantially agrees with the refractive index ($n_p$) of the solidified matrix, whereby a high transparency is obtainable when a voltage is applied. Specifically, a relation of $n_o-0.03<n_p<n_o+0.05$ should be satisfied.

In order to improve the scattering ability, it is effective to increase the volume fraction $\phi$ of the liquid crystal which is operable in the liquid crystal and solidified matrix composite. In a range of $\phi>20\%$ is preferred. In order to obtain higher scattering ability, it is preferable to be $\phi>35\%$, more preferably, $\phi>45\%$. On the other hand, when $\phi$ is excessively large, the stability in structure of the liquid crystal and solidified matrix composite becomes inferior. Accordingly, $\phi<70\%$ is preferred.

The reflection type liquid crystal optical element which shows a scattering state when no voltage is applied to is a display element having picture element electrodes. When it is used for a projection type display apparatus, the portion other than the electrode scatters light and that portion looks dark because light does not reach a projection screen even without providing a light blocking layer at the portion other than picture element portion of the back electrodes. Accordingly, it is unnecessary to block light at the portion other than the picture elements by means of the light blocking film in order to prevent light from leaking from any other portion, and therefore, there is an advantage that a step of forming the light blocking film is unnecessary.

When a electrode line is formed for the picture elements, there may be a case that a weak electric field is formed in the liquid crystal and solidified matrix composite layer between counter electrodes so that incident light passes through the liquid crystal and solidified matrix composite layer, whereby a dark display is not formed by the reflection of light at the electrode line. As measures, a light blocking film can be formed on the front electrode substrate or the back electrode substrate at a position corresponding to the electrode line.

In a case that the density of picture elements in the display area is increased and the surface area occupied by the picture element electrode portion is increased, a certain amount of reflection light from the liquid crystal and solidified matrix composite layer at the portion other than the picture element electrode portion is superposed on projection light, whereby there causes the reduction of the contrast ratio. The light blocking film used in this case may be a metallic film such as aluminum, chromium or the like, or a light absorbing material.

When a chromium light blocking film is formed on the front electrode substrate, there is a high reflectance at the interface between glass and chromium. Accordingly, specular reflection light is projected on the screen to remarkably deteriorate the contrast ratio. In order to reduce the reflection at the interface, it is preferable to form an anti-reflection film of chromium oxide between the chromium light blocking film and the glass. Further, in order to reduce an inner plane reflection light on the side of the liquid crystal and solidified matrix composite layer, it is preferable to form an anti-reflection film in combination with chromium oxide and a transparent electrode on a chromium light blocking film on the side of the liquid crystal and solidified matrix composite layer. On the other hand, when a light blocking film using a light absorbing material such as a photo polymer of black color or the like is used, influence by the reflection light is negligible because the reflection at the interface is negligible.

In a case of forming the light blocking film at the front electrode substrate side, a minute concave convex plane is preferably formed in the front electrode surface of the front electrode substrate, and then, the light blocking film is formed on the minute concave convex plane as shown in FIG. 8, whereby light blocking properties can be maintained and projection light reflected at the interface and reaching the screen can be effectively reduced. By taking such structure, specular reflection light reaching the screen is substantially removed by the scattering light removing system even when the reflection light reflected at the the interface exists, whereby a high contrast ratio can be maintained.

On the other hand, in a case of forming a metallic light blocking film at the back electrode substrate side, it is preferable to interrupt an electric field in a liquid crystal and solidified matrix composite layer corresponding to an electrode line portion by rendering the potential of the metallic light blocking film to be substantially the same as the potential of the front electrode substrate.

A voltage is applied across desired picture element electrodes. At the picture element portion to which the voltage is applied, the liquid crystal is oriented in parallel to the direction of an electric field, so that $n_0$ of the liquid crystal agrees with $n_p$ of the solidified matrix to thereby exhibit a transparent state. Thus, light is transmitted through desired picture elements to thereby provide a bright display on a projection screen.

In the above-mentioned element, when a sufficiently high voltage is applied to a specified portion while the element is cured in a curing state, the specified portion can be in a normally-light-transmitting state. Accordingly, when a fixed display is required, such normally transmitting portion may be formed.

In the present invention, when the back electrode of the reflection type liquid crystal optical element is patterned as a picture element electrode, and a TFT is used as an active element for each picture element electrode, Si is preferably used as a semiconductor material. In particular, since polycrystalline Si has less photo-sensitivity than amorphous Si, there is no erroneous operation even though light from a light source is blocked strictly by a light blocking film.

When the polycrystalline Si is used for the projection type liquid crystal type optical apparatus of the present invention, a high luminous energy light source for projection can be utilized, and a bright display can be obtained.

Further, in a case of a conventional TN type liquid crystal optical element, a light blocking film is usually formed between picture elements in order to suppress the leaking of light between the picture elements. In this case, the light blocking film can be also formed at the position corresponding to the active element in the same time of forming. The preparation of the light blocking film at the position corresponding to the active element does not substantially influence manufacturing steps as a whole. Namely, when the polycrystalline Si is used as the active element and the light blocking film is not formed at the portion of the active element, the number of manufacturing steps can not be reduced if it is necessary to form the light blocking film between the picture elements.

On the other hand, in the present invention, it is unnecessary to form the light blocking film between the picture elements because the liquid crystal and solidified matrix composite wherein the refractive index of the solidified resin matrix substantially agrees with $n_0$ of the liquid crystal used, and light is scattered at a portion where no voltage is applied, whereby it looks dark on a projection screen, as described before.

When a dielectric multi-layered film is used as a reflecting layer, the optical characteristics are determined by materials used, the number of layers and the film thickness and so on. However, when the thickness is large, driving efficiency of the liquid crystal becomes worse because a voltage drop at that portion becomes large. For instance, the reflectance of a multi-layered film essentially consisting of a $SiO_2$ films and $TiO_2$ films having a thickness of 1.5 μm is about 99% and the remaining 1% is leaking light. In the above-mentioned conditions, a voltage drop is about 0.5–0.6V although there is another factor. It is theoretically possible to achieve a reflectance of 99.99% by increasing the number of layers twice while the same material is used.

Further, by using an Si film having a high refractive index which is a light absorbing material in a visible wavelength region and by forming a multi-layered film with plurality of the Si films and $SiO_2$ films, the transmittance can be 0.01% or lower with a thin film thickness even though the reflectance does not reach 99%. The multi-layered film functions as a reflection film and a light blocking film.

Or it is possible to have light blocking property of a transmittance of 0.01% or lower while a reflectance of 99% or higher is maintained, by forming a multi-layered film essentially consisting of $SiO_2$ films and Si films alternately on a TFT, and then forming a multi-layered film essentially consisting of $SiO_2$ films and $TiO_2$ films alternately.

The reflectance is not determined primarily, but an amount of light on a screen and the intensity of light of a light source are related to it in a case of using it for the projection type liquid crystal optical apparatus. Accordingly, the multi-layered film structure is formed with the optimum combination.

When the polycrystalline Si is used as the active element, it is difficult to cause erroneous operation by light because the polycrystalline Si has a relatively low photo-sensitivity. Therefore, it is unnecessary to form the light blocking film at the position corresponding to the active element, or there is no strict demand for the light blocking property even when the film is formed. Accordingly, a step of forming the light blocking film can be eliminated or simplified, hence productivity is improved.

Further, use of amorphous Si which has higher photo-sensitivity than the polycrystalline Si is possible if the light blocking film is formed on a semiconductor portion to limit a slight amount of leaking light (for instance, in a case of a reflectance of 99–99.95%) of a dielectric multi-layered film wherein the dielectric multi-layered has a reflecting layer formed between the back electrode substrate and the liquid crystal and solidified matrix composite.

In any case of using the polycrystalline Si or the amorphous Si as the active element, an amount of the major portion of incident light is reflected by the multi-layered film so that an amount of incident light to the active element is small in a case of forming the dielectric multi-layered film reflecting layer on the back electrode substrate surface in which picture element electrodes and active elements are formed. In this case, the dielectric multi-layered film itself functions as a light blocking film and has a light blocking effect.

When stray light produced from the incident light entering into a portion other than the working surface of the liquid crystal optical element or scattering light at the liquid crystal and solidified matrix composite layer is projected on the screen, the contrast ratio is deteriorated, or a ghost image or a bright point is resulted.

In order to reduce such stray light, it is preferable to conduct a blackening treatment for absorbing light in a region other than the working surface of the liquid crystal optical element and a region which does not interfere the light path of projection light in a casing for various optical elements and holders for constituting the projection type liquid crystal optical apparatus.

Specifically, a black coating is applied to a region of glass surface near the working surface of the front electrode substrate and the side surface of the substrate of the liquid crystal optical element, or a black coating is applied to the side and back surfaces of the back electrode substrate. Further, it is preferable to apply the black coating on the optical elements such as a condenser lens, a light converging and reflecting means, a dichroic mirror or the like as far as the projection light is not interfered.

In the following, the structure of a cell in the liquid crystal optical element will be described.

In the present invention, when a photo-curable compound is used as an uncured curable compound which forms the liquid crystal and solidified matrix composite, a photo-curable vinyl compound is preferably used. Specifically, there can be exemplified a photo-curable acryl compound, and particularly, those containing acryl oligomer which is curable upon polymerization under the irradiation of light are particularly preferred.

The liquid crystal used in the present invention can be a nematic liquid crystal wherein the refractive index of the solidified matrix agrees with $n_o$ of the liquid crystal. Such liquid crystal may be used solely or may be used as a composition, and use of a composition can be advantageous because various demands such as working temperature range, working voltage and so on are satisfied. When a photo-curable compound is used for the liquid crystal and solidified matrix composite, it is preferable for the liquid crystal to uniformly dissolve the photo-curable compound in the liquid crystal. A cured material after exposure to light can not be dissolved or is hardly dissolved. When a composition is used, it is preferable to use each liquid crystal having a closer value in solubility.

The liquid crystal and solidified matrix composite may be manufactured as follows. A back electrode substrate and a front electrode substrate are arranged with electrode surfaces of the substrates facing each other, the periphery of the substrates is sealed with a sealing material, an uncured mixture solution for the liquid crystal and solidified matrix composite is injected through an injection port, and the injection port is sealed. Or, in the same manner as the ordinary liquid crystal optical element, an uncured mixture of a curable compound and liquid crystal is supplied onto either electrode substrate and then, another electrode substrate is laid over the electrode substrate.

In the liquid crystal optical element of the present invention, a dichroic dye or an ordinary dye and a pigment may be added to the liquid crystal, or a colored curable compound may be used.

In the present invention, since liquid crystal is used as solvent in the liquid crystal and solidified matrix composite, and a photo-curable compound is cured by exposing it to light, it is unnecessary to evaporate water or solvent which becomes needless when the compound is cured. Accordingly, a conventional method of injecting a curable compound into a cell can be utilized because it is cured in a closed system whereby reliability is high. Further, since the photo-curable compound is capable of bonding two substrates, reliability is higher.

Thus, by forming the liquid crystal and solidified matrix composite, a risk of causing short-circuiting between front and back electrodes is low. Further, it is unnecessary to strictly control the orientation of liquid crystal and the inter-substrate gap as in the conventional TN type liquid crystal display element. Accordingly, a liquid crystal optical element capable of controlling a transparent state and a scattering state can be efficiently produced.

The ratio of a forward-straight component reaching a projection screen and a scattering component can be controlled by the opening diameter a spot, a mirror or the like in both an aperture stop in a light source system and a second aperture stop which is a device for rejecting scattered light and the focal length of condenser lens. They can be set to obtain a predetermined contrast ratio of display and brightness.

When a device for rejecting scattered light such as an aperture is used, it is preferable that light from a projecting light source to the liquid crystal optical element is in parallel in order to increase brightness of a display. For this purpose, it is preferable to constitute a light source system in a combination of a light source having high brightness and of a nearly point source, a concave surface mirror, a condenser lens and so on. For this purpose, light having near parallelism can be obtained by using a light source having high collimation such as laser beams, and it is effective to obtain a high contrast ratio.

Further, a temperature adjusting means such as a heat-dissipation plate, a heater, a Peltier element or the like may be disposed along with a thermometer on the rear surface of the back electrode substrate, further in combination with a cooling fan, whereby temperature in the liquid crystal and solidified matrix composite can be controlled in the optimum working temperature range.

The projection type color liquid crystal optical apparatus of the present invention may be such that light from a light source for projection is color-separated into three colors by means of two kinds of flat plate type dichroic mirrors; the three color lights are entered into three reflection type liquid crystal optical elements; the lights reflected and emitted therefrom are color-synthesized in the same two kinds of flat type dichroic mirrors; and the synthesized light is projected. Accordingly, it includes not only a color display apparatus for projecting a picture image on a large projection screen but also a reflection type light modulator and an illumination device.

In the present invention, since a reflection type liquid crystal optical element is formed by using a liquid crystal and solidified matrix composite, a high scattering property can be obtained even by the liquid crystal and solidified matrix composite having a thin thickness, and a high contrast ratio is obtainable as the characteristic of the element itself.

Further, since color separating and synthesizing dichroic mirrors are constituted by two kinds and two flat plate type dichroic mirrors; the two dichroic mirrors are successively arranged without intersecting them so that both angles α1 and α2 formed by the optical axis in an optical system and the normal line of the dichroic mirror surfaces are in a range of 20°–35°, and an angle β formed between the surface of the two kinds of dichroic mirrors is in a range of 40°–70°, the spectral characteristics in color separation and synthesization of the dichroic mirrors is excellent, and a color separating and synthesizing system can be small in size.

Further, with the arrangement and the construction of each of the structural elements described above, an optical system comprising a light source system, a color separating and synthesizing system and reflection type liquid crystal display elements can be small in size.

Further, light reflected by the reflection type liquid crystal optical element is collected, and a projection lens having a second aperture stop corresponding to the magnitude of a conjugate image of the opening of the aperture stop in the light source system is used at a position where the conjugation image is formed at the second focal point of an ellipsoidal mirror, whereby the overall size of a projection type color liquid crystal optical apparatus can be reduced.

Further, by making the opening of the aperture stop at the second focal point of the ellipsoidal mirror and the opening at the second aperture stop of the projection lens variable so as to be in association with each other, the brightness of projection light on a screen and the contrast ratio on a screen can be adjusted depending on the brightness of atmosphere, whereby visibility can be improved.

Further, two kinds of dichroic mirrors have distributions so that the spectral transmittance on the surface of the dichroic mirrors is different at positions in the surfaces so as to reduce a difference in spectral transmittance which corresponds to a difference in light incident angle at positions on dichroic mirror surfaces, and a cone-like prism or a cone-like reflector is arranged in the vicinity of an aperture stop which is disposed at the second focal point of the ellipsoidal mirror in the light source system for projection, whereby a projection type liquid crystal optical system wherein a light intensity distribution and a color distribution in the plane of a screen have excellent uniformity can be obtained.

Further, the reflecting layer of the reflection type liquid crystal optical element uses a reflecting film of a dielectric multi-layered film which is formed by alternately depositing light transmitting dielectric thin films having a relatively high refractive index and light transmitting dielectric thin films having a relatively low refractive index, whereby an optical reflection plane having good flatness can be obtained as well as a high reflectance in comparison with a reflecting film of metal, with the result of obtaining a high contrast ratio.

Further, the reflection film of dielectric multi-layered film is capable of optionally adjusting the spectral reflectance and has wavelength selecting and reflecting properties, whereby it can provide effect by a reflection type optical filter in the same manner as a light absorbing type color filter. In particular, since the color separating and synthesizing dichroic mirrors are disposed between the light source optical system and the reflection type liquid crystal optical elements, color-separated lights are entered into three reflection type liquid crystal optical elements wherein at least one of the reflecting layer of the plural liquid crystal optical elements has a spectral reflectance having the wavelength selecting and reflecting properties so that the reduction of color purity by the color separating and synthesizing dichroic mirrors is compensated, whereby a projection type color liquid crystal optical apparatus having high color purity and light utilization can be obtained.

When the back electrode substrate for the reflection type liquid crystal optical element has such a structure that the charge transfer plate (CTP) having a construction that a large number of thin wires are densely embedded in an insulating substrate wherein a reflection surface is formed between the CTP and a liquid crystal and solidified matrix composite is used, a reflection type light modulating element portion is connected in a separate form to an electric field applying element portion by means of the CTP. By using such construction, a projection type liquid crystal display apparatus utilizing an optically writing means using a photoconductive member as means for applying an electric field for a picture image information or a charge writing means using a CRT can be obtained.

(EXAMPLE 1)

In the following. Examples of the present invention will be described with reference to drawings. The construction of a reflection type liquid crystal display cell according to an Example of the present invention is shown in FIG. 13.

Three back electrode substrates were prepared by forming patterned ITO transparent electrodes 636 as picture elements on a single surface of each glass substrate ("7059" by Corning) and arranging polycrystalline silicon TFTs 639 on the back electrodes 636 for each of the picture elements. On each of the back electrode substrates, a reflection film by a dielectric multi-layered film 637 wherein $SiO_2$ having a refractive index of 1.45 and $TiO_2$ having refractive index of 2.35 each having an optical film thickness nd=λ/4 (λ: wavelength of R, G and B respectively) were deposited alternately for 20 layers was formed by a vacuum deposition method on the entire portion of a display surface so as to have a reflectance of 99% or higher in each of the wavelength region of R, G and B, whereby the back electrode substrates 633 were prepared.

A light blocking film 640 was formed on the dielectric multi-layered film 637 at a position corresponding to each of the TFTs for each picture element of the back electrode substrate to completely block leaking light, entering into the TFT, which transmitted through the dielectric multi-layered film among incident light, whereby the deterioration of picture quality due to the light sensitivity of the TFT could be suppressed. The light blocking film used was not a conventionally used Cr metallic film for a front electrode substrate in a transparent type active matrix liquid crystal display element, but a black colored and a highly electric insulative photopolymer (CK-2000, Fuji Huntelectronics Technology K.K.) wherein fine carbon particles are dispersed in photopolymer.

In this case, if a metallic film is used for the light blocking film, a dielectric multi-layered film mirror disposed between the TFTs and the metallic film functions as a capacitance, whereby the characteristics of the TFTs are deteriorated. Further, in a case of a reflection type, incident light is reflected by a metallic surface, and the TFTs do not form light blocking portions corresponding to black.

On the other hand, front electrode substrates 631 were prepared by forming a minute concave-convex portion on a surface of each glass substrate to such extent that specular reflection light was reduced and transmitting light was not substantially reduced, and forming an ITO transparent electrode 635 on the minute concave-convex portion. Three reflection type liquid crystal display cells for R, G and B were prepared by sealing the peripheral portion of the back electrode substrates 633 and the front electrode substrates 631 with a sealing material. Each of the cell had a shape of diagonal line of 4.4 inches, the number of picture elements was 480 in the longitudinal direction×640 in the lateral direction, and the size of each of the picture elements was about 140 µm×140 µm. Also, the panel having further picture density or larger size is possible to be prepared as back electrode substrate by TFT process. In the reflection type cells, the aperture ratio of the picture element has a value as high as 58% in a transparent type cell before forming the reflecting film since it is unnecessary to form the light blocking film on the front electrode substrate, which was necessary for a conventional TN type liquid crystal optical element.

Further, since the reflection film of a dielectric multi-layered film is formed to provide the reflection type cell and a storage capacitor portion can be used as an opening portion, a large value as 67% could be obtained for the aperture ratio. In a case of using a conventional transparent TN type liquid crystal optical element having the same TFT structure, the numeral aperture remained to be a low value as 40% when the light blocking film was formed. Into each of the cells, solution obtained by uniformly dissolving a nematic liquid crystal having $\Delta n$ of about 0.24 and $\Delta\epsilon$ of about 16, acrylate monomer, bifunctional urethane acrylate oligomer and a photo-cure initiator was injected, and the liquid crystal and solidified matrix composite was cured by exposing it to ultraviolet rays to thereby prepare three reflection type liquid crystal display cells having an amount of liquid crystal of 68 wt %.

A driving voltage for the reflection type liquid crystal optical elements was 6 V wherein the driving voltage provides a transmittance of 90% in the saturated transmittance.

Further, a black paint 641 for absorbing light was coated on a rear surface of the back electrode substrate of the reflection type liquid crystal optical elements to reduce reflection of transmitting light at the rear surface of the back electrode substrate.

A heater-installed heat dissipation plate to which a thermocouple for measuring temperature is attached was bonded to the back electrode substrate on which the black paint was coated, and a cooling fan was disposed at the back side. Each of the reflection type liquid crystal optical elements was so formed that the temperature of the optical elements could be maintained in a range of 35° C.±5° by forcibly heating by a heater or cooling it while the temperature of the thermocouple was monitored in a state of an actual projection display.

As shown in FIGS. 1 and 2, a flat side of plano-convex lenses 31B, 32B, 33B having a focal length of 180 mm was bonded with an optical adhesive agent to a front electrode substrate of three reflection type liquid crystal display elements 31A, 32A, 33A for R, G and B to thereby form reflection type liquid crystal display element blocks 31, 32, 33 comprises each reflection layer 31C, 32C, 33C respectively. An antireflection film corresponding to each of wavelength band regions was formed on a convex surface of the lenses so that the reflectance was controlled to be 0.1% or lower.

Then, the reflection type liquid crystal display element blocks 31, 32, 33 were assembled in a projection type apparatus comprising a light source system 1 for projection system, a color separating and synthesizing system 2 and a projection lens system 4 to thereby obtain a projection type color liquid crystal optical apparatus as shown in FIGS. 1 and 2. In the light source system 1 for projection system, a metal halide lamp of 250 W and an arc length of 5 mm was used for a light source 11, and light was collected by an ellipsoidal mirror 12 with a cold mirror. The light emitting portion of the light source 11 was disposed in the vicinity of the first focal point of the ellipsoidal mirror, and a cone-like prism 14 was disposed in the vicinity of the second focal point of the ellipsoidal mirror.

The cone-like prism was directed in a manner that light enters from the bottom surface and emits toward the apex angle side. It was formed by cutting and polishing an optical glass so that the apex angle was 120°, and then, an antireflection film was formed on the front surface. Further, an aperture stop 13 having a changeable diameter for an opening was disposed at the light emitting side of the cone-like prism.

In the optical system, when an angular bisector axis between the optical axis of incident light entering to the reflection type liquid crystal optical elements and the optical axis AX of reflection light from the reflection type liquid crystal display elements is determined as a center optical axis 5, two kinds and two flat plate type dichroic mirrors 21, 22 for color separating and synthesizing were successively arranged without intersecting them so that an angle formed by the normal line of the dichroic mirrors and the center optical axis was 30°, and an angle $\beta$ formed by the surfaces of the two dichroic mirrors was 60°.

Further, the reflection type liquid crystal display elements were so arranged that an angle $\gamma$ formed between the normal line of the reflection surfaces of the display elements and the optical axes of the incident light and the reflection light was respectively about 6°. Further, they were so arranged that a plane defined by the optical axis of the incident light and the optical axis of the reflection light at the reflection surfaces of reflection type liquid crystal optical elements and a plane defined by the normal line of the two dichroic mirrors were orthogonally crossed.

In the projection type color liquid crystal optical apparatus of this Example, the apparatus is so constructed as shown in FIGS. 1 and 2 that a light R having a wavelength of red color is reflected at the first flat plate type dichroic mirror 21, and a light B having a wavelength of blue color is reflected at the second flat plate type dichroic mirror 22 while a light G having a wavelength of green color is transmitted through the mirror. The reason for the above-mentioned structure is because an edge type filter having an R reflection property or a B reflection property had more flexibility in design than a notch type filter having a G reflection property, and an improvement of color purity was easy.

The first flat plate type dichroic mirror 21 had a short wavelength transmitting type spectral characteristic wherein among light emitting from the light source optical system, an orange (R) color light having a visible wavelength of 575 nm or more is reflected and as the second flat plate type dichroic mirror 22, one having a long wavelength transmitting type spectral characteristic wherein among light transmitting through the first flat plate type dichroic mirror, a blue color light (B) having a visible wavelength of 500 nm or less is reflected while light having the other wavelength is transmitted, was used. Light transmitting through the first and second flat plate type dichroic mirrors was green color light (G).

As shown in FIG. 1, since light emitted from the light source system for projection is propagated as divergent light to the reflection type liquid crystal optical element blocks 31, 32, 33, incident angle of light to the two dichroic mirrors 21, 22, are different depending on positions of the surfaces. Namely, in a plane view in FIG. 1, an incident angle α1 assumes a small value at an upper portion of the Figure showing the first flat plate type dichroic mirror 21, and an incident angle α2 assumes a small value at a lower portion in the Figure showing the second flat plate type dichroic mirror 22.

Thus, in determination of a film thickness distribution of the dielectric multi-layered film which decides the spectral characteristics of the dichroic mirrors, a film is formed on the first flat plate type dichroic mirror to be thicker in the lower portion in comparison with the upper portion, and a film is formed on the second flat plate type dichroic mirror to be thicker in the upper portion in comparison with the lower portion, so that the spectral characteristics are the same even when incident angles of light to the dichroic mirrors are different at positions in the surfaces of the mirrors.

Since the incident light and the reflection light with respect to the reflection type liquid crystal optical elements pass the same light paths for projection in the plane view of FIG. 1, influence by an oblique incident angles between the incident light and the reflection light is the same, and accordingly, the spectral characteristics of the dichroic mirrors are effective.

Further, in the side view of FIG. 2, an incident angle to the reflection type liquid crystal optical elements is different between the incident light and the reflection light. However, there is a small influence to the spectral characteristics since the inclination angle with respect to the center of angle dispersion is small as 6° in comparison with 30° in the plane view of FIG. 1. Accordingly, it is satisfactory to form a film thickness distribution in the dielectric multi-layered film of the dichroic mirrors along the direction of the paper surface of the plane view of FIG. 1.

As described above, although there is no problem of the color purity of B and G in such construction, an yellow color (wavelength of 575 nm–595 nm) is mixed in R without correction, whereby a red color having high purity could not be obtained by and an orange color was provided. In particular, when a metal halide lamp is used, a strong emission peak is apt to take place in this wavelength region, and deterioration in the color purity is conspicuous.

In the Example, the reflection type liquid crystal display element 31 for R is so formed as to have a reflection film of a dielectric multi-layered film which reflects a visible light wavelength of 595 nm or more and have a dichroic filter having a short wavelength transmitting type spectral characteristic wherein light of 575 nm–590 nm is transmitted.

In order to correct difference of the length of light paths of B, G and R due to the transmission and reflection of light to the dichroic mirrors, the condenser lenses 31B, 32B, 33B attached to the reflection type liquid crystal display cells 31A, 32A, 33A are so formed as to have a different thickness. Namely, the condenser lenses having thicker thickness in the order of R, B and G were used.

Emission light irradiated through the opening 13 located in the vicinity of the second focal point of the ellipsoidal mirror of the light source system for projection is color-separated into R, G and B by means of the color separating and synthesizing dichroic mirrors 21, 22; each color light is rendered to be substantially parallel light beams by means of each of the condenser lenses 31B, 32B, 33B which is bonded to each of the reflection type liquid crystal optical elements 31A, 32A, 33A, and is entered into the reflection type liquid crystal display elements 31A, 32A, 33A. Reflection light from the reflection surface of the reflection type liquid crystal display elements is collected again by the same condenser lenses, and a conjugate image with respect to the opening in the vicinity of the second focal point of the ellipsoidal mirror is formed at a position which does not overlap with the opening at the second focal point position of the ellipsoidal mirror.

The projection optical system had a projection lens and a scattered light rejecting system wherein in a second aperture stop with an opening 41 as a device for rejecting scattered light, the diameter of the opening was changeable. The aperture stop was installed inside the projection lens 42 which comprises a plurality of lenses so as to form the projection optical system 4 wherein the position of a conjugate image with respect to the opening 13 at the second focal point position of the ellipsoidal mirror corresponds to the position of the changeable aperture of the projection lens. Light is projected on a projection screen which is not shown in the drawing by means of the projection optical system 4 including the aperture 41 as a structural element.

The collimation of the incident light to the reflection type liquid crystal display elements can be expressed by a spreading angle $\delta 1 (=2\tan^{-1}(\psi/2f))$ which is defined by the diameter $\psi$ of the changeable opening of aperture 13 of the light source system 1 and the focal length f of the condenser lenses 31B, 32B, 33B.

Further, a light collection angle δ2 as a spreading angle of the collimation of the projected light is determined by the diameter φ of the changeable aperture stop 41 for rejected scattered light of the projection optical system 4 and the focal length f of the condenser lenses 31B, 32B, 33B.

In the aperture stop 13 having changeable opening of the light source system for projection and a second aperture stop 41 having changeable opening of the projection optical system 4, it is preferable that the diameter of each of the openings can be adjusted to be substantially equal in the spreading angle δ1 of the emission light of the light source system and the light collection angle δ2 so as not to reduce light utilization and contrast ratio.

By using the projection type color liquid crystal display apparatus having such construction, the contrast ratio and light flux on a projection screen were measured wherein the changeable opening of aperture 13 of the light source system and the second changeable opening of aperture 41 of the projection optical system were changed under the condition of δ1=δ2, but changing the angles δ1=δ2. A result is shown in Table 1.

The data in Table 1 were obtained by calculating the optical performance the reflection type liquid crystal optical elements comprising TFT arrays from test values of the reflection type optical elements in which the multi-layered dielectric film is formed as a reflection surface on the transparent electrode film for the back electrode substrate.

TABLE 1

| Angle δ1 (= δ2) | Contrast ratio | Light flux (lumen) |
| --- | --- | --- |
| 4° | 300 | 370 |
| 6° | 200 | 700 |
| 8° | 120 | 1000 |
| 10° | 90 | 1300 |
| 12° | 60 | 1500 |

When a room in which the projection screen is disposed is bright, the light intensity of a black level in a picture image increases by the influence of ambient light. Accordingly, it is preferable to determine the angle δ1(=δ2) to be about 10°–12° to increase light fluxes for projection in order to obtain a display having good visibility and a high contrast ratio. On the other hand, when the inside of the room is dark, there is no influence by ambient light, the light intensity of the black level of the picture image can be directly recognized. Further, the brightness more than required on the screen gives glare and reduces visibility. Accordingly, it is preferable to determine the angle δ1 (=δ2) to be about 4°–6° to increase the contrast ratio and reproduce the gray-shade of dark level.

By utilizing two changeable apertures in this Example, the brightness of an image projected on the screen and the contrast ratio could be easily adjusted depending on the brightness and darkness in the atmosphere. Further, a distribution of the light intensity on the screen had high uniformity as 50% even at a peripheral portion with respect to the center. Further, a distribution of color in plane was uniform.

The chromaticity of R, G and B in the projected image showed a chromaticity better than by a CRT, and the chromaticity in an NTSC standard including a color coordinate of white could be achieved.

In this Example, polycrystalline Si having high durability to light was used for an active matrix. However, amorphous Si may be used by increasing a light blocking property by forming a thicker light blocking film. Further, an active matrix wherein a transistor is formed for each picture element on a single crystal Si wafer may be used. In this case, it is necessary to provide additionally a filter for cutting light having a wavelength region of 575 nm–590 nm in a light path for an R color light since it is not impossible to improve the color purity of the R color light by transmitting unnecessary light by utilizing a filter function by a dielectric multi-layered mirror.

(EXAMPLE 2)

In place of the back electrode and the reflection film used in Example 1, an aluminum film was used to give the function of the back electrode and the reflection film. In this case, the angle δ1(=δ2)=6°, the contrast ratio was 90 and the light fluxes were 600 lumens. Further, the color purity of red was poor and an orange color was provided.

However, by changing the film thickness structure of the multi-layered dielectric film for the first dichroic mirror 21 to deteriorate the sharpness of the color separating spectral characteristics, an yellow component (565 nm–585 nm) could be reduced. As a result, the color purity of R, G and B comparable to that by a CRT could be obtained.

(Embodiment 1)

In Example 2, a color filter for transmitting a visible light having a wavelength of 590 nm or higher and absorbing light having a short wavelength is applied to the entire surface of a flat surface of the lens 31B for R, and then, the lens is bonded to the reflection type liquid crystal display element 31A. As a result, the color purity of red could be improved to the same level as Example 1, in comparison with Example 2.

(Embodiment 2)

A cone-like reflector 15a is used instead of the cone-like prism 14 for the light source system 1 for projection used in Example 1 to thereby obtain a construction shown in FIG. 4. A glass block is cut and polished into a cone shape having the apex angle θb1 of 160°. On the surface of the cone-like body, a cold mirror for reflecting a visible light and transmitting an infrared light is formed. The cone-like reflector is disposed in the vicinity of the second focal point of the ellipsoidal mirror 12, and the light source system 1 is disposed so that the optical axis of incident light from the ellipsoidal mirror 12 and the optical axis of emission light to the color separating and synthesizing system 2 formed an angle of 60°. As a result, substantially the same characteristics as Example 1 is obtained.

(Embodiment 3)

In FIGS. 28 and 29, the structure of a reflection type liquid crystal display element of this embodiment is shown. FIG. 28 is a plane view and FIG. 29 is a cross-sectional view in a plane of $X_1-X_2$ line in FIG. 28.

A metallic film 940 is formed, instead of the light blocking film of electric insulative photopolymer used in Example 1, on the multi-layered dielectric film mirror 937 at portions other than the picture element electrodes 936 to reduce the reflection light from portions other than the picture element electrodes 936 on the back electrode substrate 933 and sufficiently block the active elements 939. Further, the electrode lines is formed so that the potential of said electrode lines agreed with the potential of the transparent electrode 935 of the front electrode substrate 931.

As a result, the portions other than the picture element electrodes 936 for display become a scattering state corresponding to the application of non-voltage 0V to show a dark display, and the contrast ratio is improved. Further, there is found an improvement to the deterioration of a projection picture image due to a photo-induced current of TFT induced by light even when there is a strong incident light.

In this case, by depositing an anti-reflection film on the metallic film 940 in contact with the liquid crystal and solidified matrix composite layer 932, a dark level at portions other than the picture element electrodes is reduced and the contrast ratio was improved.

(Embodiment 4)

Description will be made as to an embodiment in which an amorphous silicon TFT active matrix is used for the reflection type liquid crystal display element in Example 1. The electrode on/above TFT with sandwiched insulator is a major characteristic of this embodiment.

FIG. 26 is a cross-sectional view of a reflection type TFT array to be formed on a surface of a glass substrate. Gate electrodes of the TFT array are formed on a glass substrate 833. Then, a gate insulating layer, an amorphous silicon semiconductor layer and an insulating protection layer are successively formed on the gate electrodes. The three-layers formed are patterned. Then, source electrodes 862 and drain electrodes 836A are formed and subjected to patterning to thereby prepare electrode lines and active elements.

In the above-mentioned structure, a light blocking film may be formed at positions corresponding to the TFTs 839 on the back electrode substrate 833 so that when light enters into the liquid crystal display element, a leaking light incident to the TFTs can be completely blocked to thereby suppress the deterioration of picture quality due to photo-induced current of the TFTs 839. In order to form a reflection type liquid crystal display element, 23 layers of $SiO_2$ films having a refractive index of 1.45 and $Ta_2O_5$ having a refractive index of 2.1 (each having an optical film thickness of nd=λ/4 (λ: the wavelength of each of R, G and B) are alternately deposited on the back electrode substrate with the TFT array whereby a reflection surface of a multi-layered dielectric film 837 is formed in the entire displaying surface wherein the reflectance in the each wavelength band regions of R, G and B is 98% or more. In this case, the film thickness of the multi-layered dielectric film 837 is in a range of about 1.6 µm–2.1 µm.

Further, contact holes 861 are formed in the multi-layered dielectric film 837 at positions corresponding to the drain electrodes 836A of each of the TFTS. Then, an ITO film is formed as a transparent picture element electrode 836B, and the ITO film is patterned. In the manner described above, three reflection type back electrode substrates 833 are as active matrix substrates prepared. In this case, electric conduction should be maintained between the drain electrodes 836A formed at the back electrode substrate side and the transparent picture element electrodes 836B formed on the multi-layered dielectric film 837, and the TFTs and the major portion of bus electrode lines for picture elements should not be located between the transparent picture element electrodes 836B, but are concealed under the transparent picture element electrodes 836B. Since a multi-layered dielectric film mirror 837 is excellent in heat resistance and there is substantially no change in the optical characteristics even when it is heated after the formation of the film. Accordingly, a high reflectance can be maintained. On the other hand, in a case of an aluminum mirror, it is known that when it is heated after the film formation, the flatness of the surface is deteriorated and an effective specular reflectance is reduced.

Since the film thickness of the multi-layered dielectric film mirror 837 is large as 1 µm or more, the capacitance of an overlapping portion of the transparent picture element electrodes to data electrode lines and gate electrode lines is small. Accordingly, a large problem concerning the driving of the TFTs such as dull in the shape of an electric signal is avoidable.

Further, a black coating 841 for absorbing light is applied to the back surface of the back electrode substrate in the same manner as Example 1 whereby the reflection of residual transmitting light at the back surface is reduced.

For the front electrode substrate 831 as a counter electrode substrate, a glass substrate is used wherein a minute uneven plane, i.e. minute concave convex are formed in a portion corresponding to the displaying surface by a sand-blast method with blasting abrasive particle, and an ITO transparent electrode 835 is formed on the minute uneven plane to reduce specular reflection light at the interface and reduction of hysterisys of LCPC.

A light blocking film may be formed on the transparent electrode of the front electrode substrate 831 at positions other than the transparent picture element electrodes 836B and corresponding to the TFTs to thereby increase light blocking property.

Three reflection type cells for R, G and B are prepared by sealing the peripheral portions of each of the back electrode substrates 833 and each of the front electrode substrates 831 by using a sealing material. In the cells, the diagonal line is 2.1 inches long, the number of picture elements is 480 in the longitudinal direction×640 in the lateral direction, and the size of each of the picture elements is about 67 µm×67 µm. Further, the picture element occupying surface area of the transparent picture element electrodes 836B formed on the multi-layered dielectric film 837 through the contact holes can be maintained to have an aperture ratio as about 85%. Thus, a remarkably high numerical aperture ratio can be realized in comparison with that of a conventional TN type liquid crystal optical element.

In the same manner as Example 1, three reflection type liquid crystal display elements are prepared by injecting the liquid crystal and solidified matrix composite, followed by subjecting it to ultraviolet light exposure. A driving voltage for driving the reflection type liquid crystal display elements is low as about 5.5 V.

Further, a black coating 841 for absorbing light is applied to the back surface of the back electrode substrate of the reflection type liquid crystal display elements in the same as Example 1. Then, a heater-installed heat dissipation plate with a thermocouple for measuring temperature is attached to the black coating, and a cooling fan is disposed at the rear of the heat dissipation plate to adjust the temperature of the liquid crystal display elements.

The same optical system as in Example 1 is used provided that the following structural elements are different.

In FIGS. 1 and 2, plano-convex lenses having a focal length of 120 mm are used for the plano-convex lenses 31B, 32B, 33B. In the light source system for projection, a metal halide lamp of 150W and an arc length of 4 mm is used for the light source 11.

In this embodiment, a color filter glass (sharp cut filter R-60 by HOYA Co.) is disposed between the condenser lens 31B and the liquid crystal display element 31A to remove an yellow color (a wavelength range of 575 nm–595 nm) mixed with a red color.

The contrast ratio and the light flux on a projection screen were calculated by using the projection type color liquid crystal display apparatus having the construction described above wherein the angle δ1=δ2 was changed by changing changeable type aperture stop 13 of the light source system and the second changeable type aperture stop 41 of the projection optical system under the condition of δ1=δ2. A result is shown in Table 2.

TABLE 2

| Angle δ1 (= δ2) | Contrast ratio | Light flux (lumen) |
| --- | --- | --- |
| 4° | 330 | 280 |
| 6° | 220 | 530 |
| 8° | 140 | 750 |
| 10° | 100 | 980 |
| 12° | 70 | 1100 |

As apparent from the result, a high light utilization efficiency is obtainable in comparison with Example 1 even though a small-sized liquid crystal display elements and a lamp of a low electric power are used.

(Embodiment 5)

A SiN insulating layer and an aluminum reflection electrode layer are used instead of the multi-layered dielectric film mirror 837 and the transparent picture element electrodes 836B in embodiment 4.

In FIG. 26, a SiN insulating layer 837 of about 2 μm thick is formed on the TFT array. Contact holes are formed in the insulating layer, and an aluminum reflection electrode layer 836B is formed to keep an electric connection to drain electrodes 836A. Then, the aluminum reflection electrode layer is polished to make the surface of the layer to be flat, and the layer is patterned to form picture element electrodes. The structure of the reflection type liquid crystal display element is described in, for instance, "reflection type high density TFT array for high-vision liquid crystal projection type TV" of articles P.5–30 of the national meeting of 1989 Electric Information and Communication Academy in Autumn. The other structure is the same as embodiment 4.

As a result, substantially the same performance as that of embodiment 4 can be obtained provided that the light utilization efficiency and the contrast ratio are slightly poor since the reflectance of an aluminum mirror is lower than that of the multi-layered dielectric film mirror and it is difficult to form a flat reflection surface of mirror.

(Embodiment 6)

In embodiment 4, a transparent electrode film having a three-layered structure of ITO/SiO₂/ITO and having an anti-reflection effect is formed on the light blocking film for the front electrode substrate 831. As a result, the same performance as that of embodiment 4 is obtained provided that the contrast ratio is reduced by about 30% in comparison with that of embodiment 4 in which the front electrode substrate having a minute uneven plane is used.

(Embodiment 7)

In embodiment 4, a light diffusion plate is used instead of the cone-like prism 14 of the light source system for projection.

As a result, the same performance as that of embodiment 4 can be obtained provided that the light utilization efficiency is reduced to about half and the uniformity of distribution of light on screen is poor since the light flux near the center of the screen is reduced in comparison with embodiment 4.

(Embodiment 8)

A combination of an ellipsoidal mirror 12a and a spherical mirror 12b as shown in FIG. 25 is used instead of the single ellipsoidal mirror as a condenser mirror of the light source system for projection in embodiment 4. A cold mirror is formed at each reflection surface. The light emitting portion of the light source 11 is disposed in the vicinity of the first focal point of the ellipsoidal mirror 12a so as to be substantially in coincidence with the center of the curvature of the spherical mirror 12b. Further, a cone-like prism 14 is disposed in the vicinity of the second focal point of the ellipsoidal mirror 12a.

As a result, the light utilization efficiency is improved in comparison with embodiment 4.

(COMPARATIVE EXAMPLE 1)

In place of the optical system of Example 1, a conventional type optical system shown in FIGS. 20 and 21 comprising a single condenser lens and 45°—incidence—intersection type flat plate dichroic mirrors as structural elements is used. As a result, light fluxes and color purity on the screen are inferior to those of Example 1 although the contrast ratio is substantially equal. Further, the volume of the optical system is as large as double in comparison with that of Example 1. Further, a shadow corresponding to the intersecting portion of the dichroic mirrors is projected at the center of a projection image so that a uniform distribution of light intensity can not be obtained.

(COMPARATIVE EXAMPLE 2)

When a conventional optical system shown in FIGS. 18 and 19 in which a single condenser lens and dichroic prisms in a 45° arrangement are used as structural elements, is used instead of the optical system of Example 1, the contrast ratio is substantially the same as in Example 1. However, the light flux, the uniformity of distribution of light and the color purity on the screen are poor in comparison with those of Example 1. Further, the volume of the optical system becomes as large as double as that of Example 1.

(COMPARATIVE EXAMPLE 3)

When a conventional optical system shown in FIG. 27 in which a single condenser lens and a prism block of three prisms color separating and synthesizing system are used as structural elements, is used instead of the optical system of Example 1, the color purity is substantially the same. However, the light flux, the uniformity of light distribution and the contrast ratio are poor in comparison with those of Example 1. The volume of the optical system is increased double or more in comparison with that of the Example 1.

The characteristic values of Examples 1, 2 and above-mentioned embodiments b1–b10 and simulated Comparative Examples B1 through B3 are described in Table 4.

Further, the characteristics of liquid crystal optical apparatuses having a simpler structure which are used for full color lighting or illumination apparatuses in which flat electrodes without active matrix are used instead of the picture element electrodes for displaying a picture image, are obtained by optical calculation. A result obtained is shown in Table 3 for comparison (Examples A1 through A6 and simulated Comparative Examples A1 through A3).

The approximate performance values and conditions of each structural elements by the optical calculation are shown in Table 5. Although it is difficult to completely simulate the optical operations of actual ellipsoidal mirrors and reflection type liquid crystal optical elements, approximation values which can be used practically are shown.

TABLE 3

System A "Liquid Crystal Optical Apparatus for color lighting"

| Embodiment | Layout of LCD, condenser means and Dichroic Mirror optical system | Reflection means in LCD | Light source system | Characteristics Lighting efficacy | Uniformity | Chromaticity | Volume weight | Total Evaluation |
|---|---|---|---|---|---|---|---|---|
| A1 | 2 Dichroic Mirrors | ML | EM + P | ◎ | ◎ | ◎ | ○ | ◎ |
| A2 | in V-like layout | Al | EM + P | ○ | ◎ | Δ | ○ | ○ |
| A3 | and 3 LCD panels | ML | EM + M | ◎ | ◎ | ◎ | ○ | ◎ |
| A4 | with condenser | ML | EM + dif | Δ | Δ | ◎ | ◎ | ○ |
| A5 | means in | ML | EM + SM, + P | ☆ | ◎ | ◎ | ◎ | ☆ |
| A6 | Δ-like layout | ML | PM + lens | ◎ | Δ | ◎ | Δ | ○ |
| comparative A1 | 45° layout cross DM and LCD with lens (prior art) | ML AL | PM + lens EM + P | Δ Δ | X X | Δ X | X Δ | X X |
| comparative A2 | 45° layout DM-prism and LCD with lens (prior art) | ML AL | PM + lens EM + P | Δ Δ | Δ ◎ | Δ X | X Δ | X X |
| comparative A3 | DM prism block attached 3 LCD panels and lens unit (prior art) | ML AL | PM + Lens EM + P | Δ Δ | Δ ◎ | ◎ Δ | X X | X X |

Conditions: ① without color filter and ② with  front substrate for ITO side Rank: ☆ > ◎ > ○ > Δ > X

TABLE 4

System B "Liquid Crystal Optical Apparatus for color Picture Projecting"

| Ex. and Emb. | Layout of LCD, condenser means and DM optical system | color filter | front subst. | Reflection means in LCD | Light source system | Project. efficacy | Contrast ratio | Uniformity | Chromaticity | Volume weight | Total Evaluation |
|---|---|---|---|---|---|---|---|---|---|---|---|
| B1 | 2 Dichroic | no | ⊔⊥ | ML | EM + P | ◎ | ◎ | ◎ | ◎ | ○ | ◎ |
| B2 | Mirrors | no | | Al | EM + P | ○ | ○ | ◎ | Δ | ○ | ○ |
| b1 | in V-like lay- | yes | | Al | EM + P | ○ | ○ | ◎ | ◎ | ○ | ○ |
| b2 | out and | no | | ML | EM + M | ◎ | ◎ | ◎ | ◎ | ○ | ◎ |
| b3 | 3 LCD panels | yes | | ML | EM + P | ◎ | ◎ | ◎ | ◎ | ○ | ◎ |
| b4 | with | yes | | ML(2) | EM + P | ☆ | ◎ | ◎ | ◎ | ◎ | ☆ |
| b5 | condenser | yes | | Al(2) | EM + P | ◎ | ○ | ◎ | ◎ | ◎ | ◎ |
| b6 | means in Δ- | yes | AR | ML(2) | EM + P | ☆ | Δ | ◎ | ◎ | ◎ | ○ |
| b7 | like layout | yes | | ML(2) | EM + dif. | Δ | ◎ | Δ | ◎ | ◎ | ○ |
| b8 | | yes | | ML(2) | EM +SM, + P | ☆ over | ◎ | ◎ | ◎ | ◎ | ☆ over |
| compar. B1 | 45° layout cross DM and LCD with lens | no yes | ⊔⊥ | ML AL | PM + lens EM + P | Δ Δ | Δ Δ | X X | Δ Δ | X Δ | X X |
| compar. B2 | 45° layout DM-prism and LCD with lens | no yes | | ML AL | PM + lens EM + P | Δ Δ | Δ Δ | ○ ◎ | X Δ | X Δ | X Δ |
| compar. B3 | DM 3 prism block attached 3 LCD, lens unit | no yes | | ML AL | PM + Lens EM + P | Δ Δ | Δ Δ | ○ ◎ | ◎ ◎ | X X | X X |

TABLE 5

| No. | Name of Part | Element | Estimated Performance |
|---|---|---|---|
| 1 | Color filter | light absorption type color filter for chromaticity improvement | Red primary color used<br>yes 610 nm<br>no 590 nm |
| 2 | Front substrate | | Interface reflectance |
| | (ITO side) of LCD | ⊔⊥ minute concave-convex<br>AR antireflection coating with ITO | ≦0.2%<br>≧0.6% |
| 3 | Reflection layer (mirror) | | reflectance × (aperture ratio) |
| | of LCD | ML dielectric multi-layered mirror | 65% |

TABLE 5-continued

| No. | Name of Part | | Element | | Estimated Performance |
|---|---|---|---|---|---|
| | | Al | aluminum metallic mirror | | 48% |
| | | ML(2) | dielectric multi-layered mirror covered with ITO picture electrode connected to active matrix node (terminal) through a contact hole | | 83% |
| | | Al(2) | aluminum metallic mirror electrode connected to active matrix node (terminal) through a contact hole formed at insulator layer | | 61% |
| 4 | Light source system | | | | relative efficacy (collection angle) |
| | a) Reflection means | EM | ellipsoidal mirror | | 70 (8") |
| | | PM + lens | paraboric mirror plus lens | | 50 (12") |
| | | EM + SM | ellipsoidal mirror plus spherical mirror | | 100 (8") |
| | b) Light | | | | relative efficacy |
| | collection means | prism | conelike prism | | 95 |
| | | mirror | conelike reflector | | 100 |
| | | diffuser (dif) | light diffuser | | 40 |

(Embodiment 9)

In place of the reflection type liquid crystal display element wherein a TFT is formed for each picture element in Example 1, a reflection type spatial light modulator was used as shown in FIG. 14. A FAP was used for a back electrode substrate 643. FAP is a glass substrate which is formed slicing and polishing a bonded bundle of optical fibers each having a diameter of 10 μm wherein glass having relatively large refractive index is used as a core and glass having relatively small refractive index is used as a clad.

A back electrode substrate 643 is prepared as follows. A $SnO_2$ film is formed as a transparent electrode 646 on a single surface of the FAP. On the film, an amorphous Si photo-conductive film 649 having a film thickness of 10 μm and a CdTe film as a light blocking film 650 having a film thickness of 1 μm are successively formed. Finally, $SiO_2$ having a refractive index of 1.45 and $TiO_2$ having refractive index of 2.35 are alternatively deposited to have the number of layers of 40 wherein each optical film thickness is nd=λ/4 (λ: the central wavelength of the wavelength region of each R, G or B), and then, a reflection film of a dielectric multi-layered film 647 is formed on the CdTe film so that the reflectance of the wavelength of each R, G or B is 99.9% or more.

A front electrode substrate 631 is used wherein an ITO transparent electrode 635 is formed on a minute concave-convex surface which reduces specular reflection light but does not reduce substantially transmitting light, the concave-convex surface being formed in a surface of the glass substrate, in the same manner as Example 1. Three reflection type cells having a diagonal line of 5 inches are prepared for R, G and B by sealing the peripheral portion of back electrode substrate 643 and front electrode substrate 631 with use of a sealing material.

In the same manner as Example 1, three reflection type spatial light modulators having an amount of liquid crystal of 68 wt % are prepared by injecting into the cells solution which is obtained by uniformly dissolving the nematic liquid crystal having Δn of about 0.24 and Δε of about 16, acrylate monomer, bifunctional urethane acrylate oligomer and a photo-curing initiator, and curing a liquid crystal and solidified matrix composite by exposure to ultraviolet rays.

The front electrode substrate of the three reflection type spatial light modulator is bonded to a flat surface of each plano-convex lens in the same manner as Example 1. A CRT having an effective display surface of diagonal line of 4.5 inches wherein an FAP is used as a face plate is bonded to the FAP which is the back electrode substrate for a reflection type spatial light modulator to thereby obtain an optical addressing input picture image.

Thus, the reflection type liquid crystal optical elements 31, 32, 33 are prepared and they were assembled in the same projection type apparatus as Example 1. As a result, in the construction of this Example, the aperture ratio could be effectively improved and light flux of projection light could be increased by about 20% whereas only light corresponding to a aperture ratio of 67% in that of the TFT could be utilized.

The other optical characteristics are substantially the same as those in Example 1.

In this Example, the amorphous Si photo-conductive film is used as material for optically addressing a picture image. However, a CdS film, amorphous Se, single crystal $BI_2SiO_{20}$ or the like may be used as a photo-conductive material.

Further, besides a CdTe film as a light blocking film, a dielectric multi-layered film mirror wherein Si and $SiO_2$ are alternately deposited so that the optical film thickness (refractive index×film thickness) is λ/4 with respect to the central wavelength λ of a light blocking wavelength band region may be used, or there may be photopolymer of black color and having high electric insulation property wherein fine carbon particles are dispersed in the photopolymer as described in Example 1. Any material having high electric insulation property and high light absorbing coefficient may be used.

(Embodiment 10)

As the reflection type spatial light modulator of embodiment 9, a reflection type liquid crystal display element utilizing a CTP is used. In this embodiment, a dielectric multi-layered film mirror 737 is formed on a single side of a CTP 750 in the same manner as embodiment 9 to use it as a back electrode substrate 750 of the reflection type liquid crystal display element.

On the other hand, a front electrode substrate 731 in which an ITO transparent electrode 735 is formed on a minute concave-convex surface which reduces specular reflection light but does not reduce substantially transmitting light, the minute concave-convex surface being formed in a plane of glass substrate, in the same manner as Example 1.

Three reflection type cells for R, G and B having a diagonal line of 2 inches are prepared by sealing the peripheral portions of back electrode substrates 750 and front electrode substrates 731 by using a sealing material.

In the same manner as Example 1, three reflection type liquid crystal elements having an amount of liquid crystal of 68 wt % are prepared by injecting into cells solution which was obtained by dissolving a nematic liquid crystal having $\Delta n$ of about 0.24 and $\Delta \epsilon$ of about 16, acrylate monomer, bifunctional urethane acrylate oligomer and a photo-curing initiator, and curing a liquid crystal and solidified matrix composite by exposure to ultraviolet rays.

There can be considered a method of inputting a voltage corresponding to a picture image on a single face of the CTP 750 of the reflection type liquid crystal element.

For instance, an optical addressing type reflection type spatial light modulator can be realized in the same manner as Embodiment 9 by using the CTP as the back electrode substrate wherein a photo-conductive material such as an amorphous Si film is formed on a surface where a dielectric multi-layered film mirror of the CTP750 is not formed, a transparent electrode being formed on the photo-conductive material, and by applying a predetermined a.c. voltage across the electrode 735 on the front electrode substrate 731. In this case, the function of the light blocking film in embodiment 9 is performed by using a light absorbing material as an insulating material for the CTP.

In another embodiment as shown in FIG. 16, an active matrix substrate 733 may be attached to one side of the CTP by applying a bump bonds 760. With such structure, a voltage applied to a picture element 736 of the active matrix is given directly to the liquid crystal and solidified matrix composite layer 732 through the CTP. Accordingly, it is unnecessary for the active matrix substrate itself to take a reflection type structure as in Example 1, and the structure of the active matrix substrate can be exactly the same as a transparent type structure. Further, it is unnecessary to form a photo-conductive layer as in embodiment 9, and the structure is simple since an optical addressing picture image is not needed.

As another embodiment shown in FIG. 17, a voltage indicative of information of a picture image may be applied directly to the liquid crystal and solidified matrix composite layer 732 through the CTP by scanning electric charges on the surface of the CTP in combination of an electron gun 774 and an electronic lens 773 used for a CRT at a side of the CTP 750.

As shown in FIG. 17, although the electron gun 774 can emit only negative electric charges, a mesh electrode 772 can be disposed in the vicinity of the surface of the CTP and a voltage applied thereto is adjusted whereby the secondary electric charge discharging characteristics of an insulating material 771 on the surface of the CTP can be controlled. As a result, positive electric charges can be supplied to the surface of the CTP. In this case, it is preferable to form an insulating material having a large secondary electron emission coefficient, such as MgO, $CaF_2$ or the like on the surface of the CTP in order to supply the positive electric charges at a high speed. Further, in a case of an electron-beam addressing type, a method of preparing the reflection type liquid crystal display element is different from the other because of using a process of manufacturing CRTs. Namely, after the CRT having the CTP 750 with reflection film 737 as a face plate (FIG. 17) has been manufactured, a reflection type cell is prepared wherein the CTP is used for a back electrode substrate, and then, the liquid crystal and solidified matrix composite is injected and is subjected to light exposure.

In the spatial light modulator in embodiment 9, the CRT or the liquid crystal display element is additionally required as a picture image producing means for addressing. However, by forming the reflection type liquid crystal display element having the construction as shown in FIG. 17, information which is related to an amount of electric charges in the CRT can be applied as a voltage directly to the liquid crystal and solidified matrix composite layer without converting an electric charge energy into light by means of fluorescent substance. Accordingly, the structure can be simple and the deterioration of resolution and energy loss due to the conversion to light by means of the fluorescent substance can be reduced.

When the CTP is used for the back electrode substrate, the surface area occupied by an electric conductive portion should be larger because the surface area occupied by the electric conductive portion in the back electrode substrate constitutes an effective picture element electrode surface. In the preparation of an actual CTP, there is limitation to the surface area to be occupied by the electric conductive portion. Accordingly, it is preferable to form picture element electrodes at the reflection surface side of the CTP to obtain a large surface area for the picture element electrodes even in a case that a relatively thin conductive wire is used. Namely, a metallic film or a transparent electrode film, after it has been formed on the surface of the CTP, can be patterned to obtain the shape of the picture elements. When a silver film or an aluminum film having a high reflectance is used for the picture element electrodes, it also functions as a reflecting layer. On the other hand, when the transparent picture element electrode is used, a high reflectance and high durability are obtainable by forming a multi-layered dielectric reflecting layer on the entire surface of the transparent picture element electrode.

(Embodiment 11)

Instead of the reflection type liquid crystal display elements in Example 1, reflection type liquid crystal optical elements as shown in FIG. 11 are used. A light collecting mirror substrate 533 as a back electrode substrate is made of glass having an ellipsoidal surface which is nearly a spherical surface wherein a minute concave-convex portion is formed on a flat surface side and a transparent electrode 536 is formed on it. On an ellipsoidal surface side, a dielectric multi-layered film mirror 537 corresponding to each wavelength region of R, G and B is formed. The spectral characteristics are the same as those of Example 1.

A front electrode substrate 531 comprises a glass substrate having a minute concave-convex portion formed on a surface of the glass substrate to such extent of reducing specular reflection light and not substantially reducing transmitting light, and an ITO transparent electrode 535 formed on the concave-convex portion in the same manner as those of Example 1.

Three reflection type cells for R, G and B having a cell shape and a diagonal line of 3 inches are prepared by sealing with a sealing material the peripheral portions of back electrode substrates 533 and front electrode substrate 531, and the liquid crystal and solidified matrix composite is injected, which was then, exposed to light, whereby reflection type liquid crystal optical elements are prepared.

Thus formed reflection type liquid crystal optical elements are assembled in the same projection type apparatus as Example 1 to use it as an illuminator. As a result, a small-sized illuminator having a light reducing ratio of 1000:1 or more and capable of high speed light modulation of full color could be obtained wherein two kinds of aperture stops of the light source system and the projection system are made variable and a voltage to be applied to the three reflection type liquid crystal optical elements is adjusted.

In the projection type color liquid crystal optical apparatus of the present invention, a reflection type liquid crystal optical element in which a liquid crystal and solidified matrix composite capable of electrically controlling a scattering state and a transparent state is held, and liquid crystal is held between a front electrode substrate and a back electrode substrate, is used. Accordingly, a polarization plate is no longer necessary, and transmittance of light in a transparent state can be greatly improved and a bright projection image can be obtained in comparison with a conventional TN type liquid crystal optical element.

A reflection type liquid crystal optical element used for the present invention can control effectively scattering and transparent properties by changing a state of application of a voltage. Accordingly, it can be driven at a low voltage since a substrate gap can be small in comparison with that used in a transmitting type. It has a high contrast ratio and a display of high brightness is possible even in a case of using a driving IC for a conventional TN type liquid crystal optical element.

In particular, since a reflection film of a dielectric multi-layered film is used as a reflection film for the back electrode substrate, there are few problems such as the deterioration of an optical mirror surface due to a reaction to a substrate interface material, and a flat mirror surface having high reflectance and free from light absorption can be easily obtained. Further, there is no problem of short-circuiting of electrode lines because it has no electric conductivity.

Further, wavelength selecting and reflecting properties can be provided by a multi-layered film structure. Accordingly, it is possible to obtain function as a reflection type color filter without absorption, and it is possible to form a thin substrate gap whereby a bright projection display having good contrast ratio can be obtained while it takes an advantage of possibility of low voltage driving.

Further, since a minute uneven plane is formed in the transparent electrode in contact with the liquid crystal and solidified matrix composite layer of the front electrode substrate in the reflection type optical element to thereby reduce specular reflection, the superposition of reflection light reflected at the interface of a projection image in a time when the liquid crystal and solidified matrix composite layer is in a scattering state can be reduced, and a projected image can be obtained at a high contrast ratio.

Further, since the reflection type liquid crystal optical element used for the present invention unnecessitates the polarization plate, wavelength dependency of the optical characteristics is small and color correction of the light source is substantially unnecessary. In addition, problems of an orientation treatment such as rubbing which, is essential to the TN type liquid crystal optical element, and the destruction of an active element due to static electricity produced from the treatment can be eliminated, whereby yield of manufacturing of the liquid crystal optical element can be remarkably improved.

The liquid crystal and solidified matrix composite exhibits a film-like form after curing, and accordingly, there are few problems of short-circuiting across the substrates by the compression of the substrate and the destruction of the active element due to movement of a spacer.

Further, in the liquid crystal and solidified matrix composite, since the specific resistance is the same as that of a conventional TN mode; it is unnecessary to provide a larger storage capacitor for each picture element electrode as in a conventional DS mode; design of the active element is easy; the aperture ratio which is the proportion of an effective picture element electrode surface area can be increased, and power consumption for the liquid crystal optical element can be kept small.

Further, it can be manufactured by removing an orientation film forming step from manufacturing steps for a conventional TN mode liquid crystal optical element, whereby the production is easy.

The liquid crystal optical element using the liquid crystal and solidified matrix composite has a feature of a short response time as well as a feature of easily displaying a dynamic picture. Further, since the electro-optical characteristics (voltage-transmittance) of the liquid crystal optical element has a relatively gentle characteristics in comparison with a TN mode liquid crystal optical element, and therefore, application to a gray shade display is easy.

In the liquid crystal optical element used for the present invention, light is scattered at a portion where no voltage is applied by substantially agreeing the refractive index of a solidified matrix with $n_o$ of liquid crystal used whereby there is no danger of leaking light during projection of light without completely blocking light at a portion other than picture elements by means of a light blocking film, and accordingly, it is unnecessary to block light strictly for spaces between adjacent picture elements.

Accordingly, by using an active element formed of polycrystalline Si, a light source for projection having high brightness can be used without using a light blocking film at a portion corresponding to the active element or only by providing a simple light blocking film, so that a projection type liquid crystal optical apparatus having high brightness can be easily obtained. In this case, the light blocking film may not be used at all, or only a simple light blocking film can be used, hence, manufacturing process can be further simplified.

However, it is essential to block light to the active element in a case that the illuminance of incident light to the reflection type display element is very high.

Color separating and synthesizing dichroic mirrors are constituted by two kinds and two flat plate type dichroic mirrors; two dichroic mirrors are successively arranged without intersection so that an angle $\alpha(\alpha1, \alpha2)$ formed between the optical axis in the optical system and the normal line of the dichroic mirrors is 20°–35°; and two kinds of dichroic mirrors are so arranged that an angle $\beta$ formed by the surface of the dichroic mirrors is 40°–70°. Accordingly, the spectral characteristics of color separation and synthesization of the dichroic mirrors are excellent so as to make full color projection light with high chromaticity, and a color separating and synthesizing system can be small in size.

With the arrangement and the structure of the structural element described above, the size of the optical system comprising the light source system, the color separating and synthesizing system and the reflection type liquid crystal display element can be small.

Further, by using a projection lens having a opening corresponding to the magnitude of an image in the opening at a position where light reflected by the reflection type liquid crystal optical element is focused and a conjugate image with respect to the opening located at the second focal point position of an ellipsoidal mirror is formed, miniaturization of a projection type liquid crystal optical system can be achieved.

Further, by making the opening portion of the aperture stop of the light source optical system variable in association with the opening portion, the second aperture stop of the projection system, the contrast ratio and the brightness of a projection image can be adjusted, and a display having a high visibility depending on brightness in ambient becomes possible.

The two kinds of dichroic mirrors respectively have a distribution of spectral transmittance which is different depending on positions in the surface of the dichroic mirrors so that difference of spectral transmittance corresponding to the difference of light incident angles at positions in the surface of the mirrors is reduced, and a cone-like prism or a cone-like reflector is disposed in the vicinity of an aperture stop which is arranged at the second focal point of the ellipsoidal mirror in the light source system for projection. Accordingly, a projection type liquid crystal optical apparatus having excellent uniformity in a light intensity distribution and a color distribution of light projected on a screen, can be obtained.

Further, in a preferred embodiment using a CTP having a reflection mirror on its one surface as a back electrode substrate for the reflection type liquid crystal optical element, it is easy to apply a voltage corresponding to a picture image information. In particular, it is effective to a reflection type liquid crystal optical element in which a CRT is used as an electric image supplying means.

The back electrode substrate of the reflection type liquid crystal display element of the present invention comprises a substrate, a plurality of row electrode lines, a plurality of column electrode lines, active elements disposed at positions of the intersections of the row and column electrode lines, a multi-layered dielectric film mirror formed on the row and column electrode lines and the active elements, and a patterned transparent electrodes for picture elements which are formed on the mirror wherein the transparent electrodes are electrically connected to the active elements through contact holes formed in the multi-layered dielectric mirror. Accordingly, there is no close relation among the active elements, material for the back electrode substrate and the parts of the picture elements whereby flexibility in selecting structural elements is increased and a large numerical aperture can be achieved. Further, a bright projection image is obtainable.

In the present invention, various applications are possible as long as the effect of the present invention is not reduced.

What is claimed is:

1. A projection type liquid crystal optical apparatus comprising:
   (a) a light source system comprising a light source that emits a light, a reflection mirror and a first aperture device;
   (b) a light modulation system configured to modulate a light which is emitted from an opening of said first aperture device, comprising,
      ($b_1$) a liquid crystal optical element having a front substrate with a transparent front electrode wherein minute concaves and convexes are formed on a surface of the front electrode or on an interface of the front substrate, a back substrate with reflective pixel electrodes, a liquid crystal and solidified matrix composite layer disposed between said front substrate and said back substrate, and
      ($b_2$) condenser lens having a convex surface and a plane surface facing said liquid crystal optical element; and
   (c) a light projection optical system comprising projection lenses and a second aperture device having an aperture, wherein a modulated light in said light modulation system is passed through the aperture of said second aperture device.

2. A projection type liquid crystal optical apparatus according to claim 1, further comprising a color separating and synthesizing system comprising two color separating and synthesizing layers being arranged in a horizontal plane with an included angle of 40° to 70° with respect to each other; wherein
   said light emitted from said light source system having an incident angle of $a_1$, $a_2$ in a range of 20° to 35° with respect to each of said color separating and synthesizing layers, and
   three liquid crystal optical elements in said light modulation system being arranged for three color lights respectively separated by said color separating and synthesizing layers.

3. A projection type liquid crystal optical apparatus according to claim 1, wherein said first aperture device is configured to have a changeable aperture opening size and said second aperture device is configured to have a changeable aperture opening size.

4. A projection type liquid crystal optical apparatus according to claim 2, wherein said first aperture device is configured to have a changeable aperture opening size and said second aperture device is configured to have a changeable aperture opening size.

5. A projection type liquid crystal optical apparatus according to claim 1, wherein said condenser lens having a convex front surface and a plane back surface is attached to a front surface of said liquid crystal optical element.

6. A projection type liquid crystal optical apparatus according to claim 2, said condenser lens having a convex from surface and a plane back surface is attached to a front surface of said liquid crystal optical element.

7. A projection type liquid crystal optical apparatus according to claim 3, said condenser lens having a convex front surface and a plane back surface is attached to a front surface of said liquid crystal optical element.

8. A projection type liquid crystal optical apparatus according to claim 4, said condenser lens having a convex front surface and a plane back surface is attached to a front surface of said liquid crystal optical element.

9. A projection type liquid crystal optical apparatus according to claim 1, wherein said light emitted from said light source system has a collection angle less than or equal to 10°.

10. A projection type liquid crystal optical apparatus according to claim 2, wherein said light emitted from said light source system has a collection angle less than or equal to 10°.

11. A projection type liquid crystal optical apparatus according to claim 3, wherein said light emitted from said light source system has a collection angle less than or equal to 10°.

12. A projection type liquid crystal optical apparatus according to claim 4, wherein said light emitted from said light source system has a collection angle less than or equal to 10°.

13. A projection type liquid crystal optical apparatus according to claim 5, wherein said light emitted from said light source system has a collection angle less than or equal to 10°.

14. A projection type liquid crystal optical apparatus according to claim 6, wherein said light emitted from said light source system has a collection angle less than or equal to 10°.

15. A projection type liquid crystal optical apparatus according to claim 7, wherein said light emitted from said light source system has a collection angle less than or equal to 10°.

16. A projection type liquid crystal optical apparatus according to claim 8, wherein said light emitted from said light source system has a collection angle less than or equal to 10°.

17. A projection type liquid crystal optical apparatus according to claim 9, wherein said light emitted from said light source system has a collection angle less than or equal to 10°.

18. A projection type liquid crystal optical apparatus according to claim 2, wherein said color separating and synthesizing layers comprise a dichroic mirror.

19. A projection type liquid crystal optical apparatus according to claim 1, wherein an opening shape of said aperture of said first aperture device is similar to an opening shape of said aperture of said second aperture device.

20. A projection type liquid crystal optical apparatus according to claim 2, wherein an opening shape of said aperture of said first aperture device is similar to an opening shape of said aperture of said second aperture device.

* * * * *